US012640408B2

(12) United States Patent
Xie et al.

(10) Patent No.: US 12,640,408 B2
(45) Date of Patent: May 26, 2026

(54) BATTERY HEATING SYSTEM, ELECTRIC VEHICLE, AND IN-VEHICLE SYSTEM

(71) Applicant: Huawei Digital Power Technologies Co., Ltd., Shenzhen (CN)

(72) Inventors: Jie Xie, Shenzhen (CN); Guanghui Zhang, Dongguan (CN); Wei Liu, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 978 days.

(21) Appl. No.: 17/738,679

(22) Filed: May 6, 2022

(65) Prior Publication Data

US 2022/0263144 A1     Aug. 18, 2022

Related U.S. Application Data

(63) Continuation of application No. PCT/CN2020/127227, filed on Nov. 6, 2020.

(30) Foreign Application Priority Data

Nov. 8, 2019     (CN) .......................... 201911089521.8

(51) Int. Cl.
H01M 10/615 (2014.01)
H01M 10/44 (2006.01)
(Continued)

(52) U.S. Cl.
CPC ....... H01M 10/443 (2013.01); H01M 10/486 (2013.01); H01M 10/615 (2015.04);
(Continued)

(58) Field of Classification Search
CPC ............. H01M 10/615; H01M 10/637; H01M 10/6571
(Continued)

(56) References Cited

U.S. PATENT DOCUMENTS

| | | | | |
|---|---|---|---|---|
| 2008/0143281 A1* | 6/2008 | Yaguchi | ................ | H01M 10/42 |
| | | | | 318/471 |
| 2012/0021263 A1 | 1/2012 | Nishi et al. | | |
| 2022/0263144 A1 | 8/2022 | Xie et al. | | |

FOREIGN PATENT DOCUMENTS

| | | |
|---|---|---|
| CN | 203721844 U | 7/2014 |
| CN | 203721845 U | 7/2014 |
| | (Continued) | |

OTHER PUBLICATIONS

English Translated Copy from Espacenet (Year: 2019).*

(Continued)

*Primary Examiner* — Julian D Huffman
*Assistant Examiner* — Ryu-Sung P. Weinmann
(74) *Attorney, Agent, or Firm* — Conley Rose, P.C.

(57)     ABSTRACT

A battery heating system includes: a temperature monitoring circuit configured to output a temperature monitoring signal; a voltage conversion circuit configured to receive a first voltage that is input by a power supply or a second voltage that is input by a to-be-heated battery; and a control circuit configured to receive the temperature monitoring signal and output a control signal. The voltage conversion circuit is configured to perform boosting processing or bucking processing on the first voltage based on the control signal or perform boosting processing or bucking processing on the second voltage based on the control signal to enable the to-be-heated battery to receive a charging current from the power supply in a first time segment using the voltage conversion circuit and the to-be-heated battery to output a discharging current to the power supply in a second time segment using the voltage conversion circuit.

20 Claims, 10 Drawing Sheets

<u>100</u>

(51) Int. Cl.
| | | |
|---|---|---|
| *H01M 10/48* | (2006.01) | |
| *H01M 10/625* | (2014.01) | |
| *H01M 10/633* | (2014.01) | |
| *H01M 10/657* | (2014.01) | |

(52) U.S. Cl.
CPC ....... *H01M 10/625* (2015.04); *H01M 10/633* (2015.04); *H01M 10/657* (2015.04); *H01M 2220/20* (2013.01)

(58) Field of Classification Search
USPC .................................. 320/129, 136; 324/525
See application file for complete search history.

(56) References Cited

FOREIGN PATENT DOCUMENTS

| | | | | | |
|---|---|---|---|---|---|
| CN | 104064836 | A | | 9/2014 | |
| CN | 206878144 | U | | 1/2018 | |
| CN | 107994299 | A | | 5/2018 | |
| CN | 109301366 | A | * | 2/2019 | ........... H01M 10/42 |
| CN | 109950660 | A | | 6/2019 | |
| CN | 110085947 | A | | 8/2019 | |
| CN | 111029667 | A | | 4/2020 | |
| EP | 3432439 | A1 | | 1/2019 | |
| JP | 2015002108 | A | | 1/2015 | |

OTHER PUBLICATIONS

Sun Fengchun et al., "Hybrid Electric Drive Technology for Armored Vehicles (2nd Edition)," eDefense Industry Press, Dec. 2016, with an English abstract, 7 pages.

\* cited by examiner

100

<u>100</u>

External power supply

300

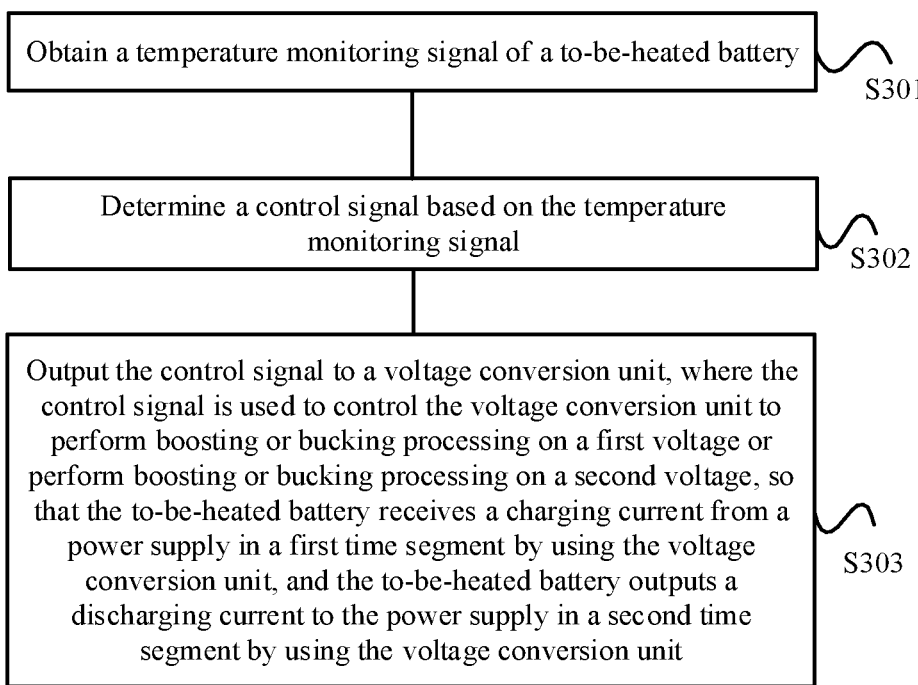

Obtain a temperature monitoring signal of a to-be-heated battery   S301

Determine a control signal based on the temperature monitoring signal   S302

Output the control signal to a voltage conversion unit, where the control signal is used to control the voltage conversion unit to perform boosting or bucking processing on a first voltage or perform boosting or bucking processing on a second voltage, so that the to-be-heated battery receives a charging current from a power supply in a first time segment by using the voltage conversion unit, and the to-be-heated battery outputs a discharging current to the power supply in a second time segment by using the voltage conversion unit   S303

FIG. 15

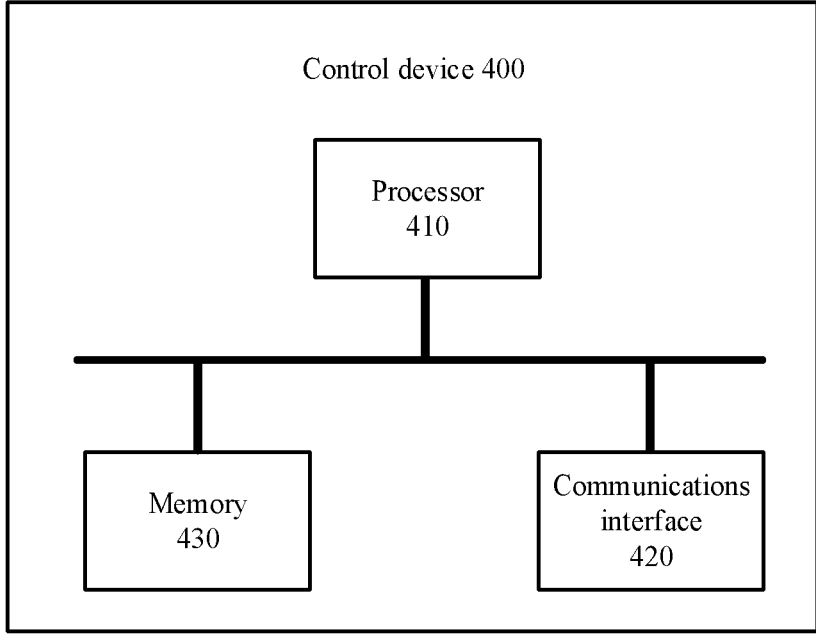

Control device 400

Processor 410

Memory 430

Communications interface 420

FIG. 16

BATTERY HEATING SYSTEM, ELECTRIC VEHICLE, AND IN-VEHICLE SYSTEM

CROSS-REFERENCE TO RELATED APPLICATIONS

This is a continuation of International Patent Application No. PCT/CN2020/127227 filed on Nov. 6, 2020, which claims priority to Chinese Patent Application No. 201911089521.8 filed on Nov. 8, 2019. The disclosures of the aforementioned applications are hereby incorporated by reference in their entireties.

TECHNICAL FIELD

This application relates to the field of electronic technologies, and in particular, to a battery heating system, an electric vehicle, and an in-vehicle system.

BACKGROUND

A typical battery pack is formed by connecting a plurality of cells in series or in parallel, and many types of battery packs include a rechargeable mono-cell battery. A mono-cell battery used to form a rechargeable battery pack needs to work in a proper temperature range. An excessively high or low battery temperature is not conducive to play battery performance, and is prone to cause a security risk. An available capacity of the battery greatly decreases at a relatively low temperature. As a result, the battery cannot discharge electricity or be charged in a low temperature condition. In addition, rate performance of the battery seriously deteriorates, which limits play of battery performance. In addition, in a low-temperature charging condition, a lithium plating reaction is prone to occur due to low battery activity. As a result, an internal short circuit of the battery occurs, causing a serious security risk. Therefore, in the low temperature condition, the battery needs to be heated to a proper temperature before use.

In the conventional technology, an external heating manner such as heating using a wide-wire metal film or heating using an electric heating wire is usually used to control a temperature of a heater to rise, and then a battery is heated through contact conduction, cross ventilation, or heat transfer through liquid. This requires relatively large space and relatively high costs. In addition, a temperature gradient is prone to be formed in a battery pack through external heating, and most of energy is dissipated, and consequently energy utilization is low.

SUMMARY

This application provides a battery heating system, an electric vehicle, and an in-vehicle system, to quickly and evenly heat a battery.

According to a first aspect, a battery heating system is provided, including a temperature monitoring unit configured to monitor a temperature of a to-be-heated battery, and output a temperature monitoring signal, where the temperature monitoring signal is used to indicate the temperature of the to-be-heated battery, a voltage conversion unit, separately connected to a power supply and the to-be-heated battery, and configured to receive a first voltage that is input by the power supply or a second voltage that is input by the to-be-heated battery, and a control unit configured to receive the temperature monitoring signal, and output a control signal to the voltage conversion unit based on the temperature monitoring signal. The voltage conversion unit is configured to perform boosting or bucking processing on the first voltage based on the control signal or perform boosting or bucking processing on the second voltage based on the control signal, so that the to-be-heated battery receives a charging current from the power supply in a first time segment by using the voltage conversion unit, and the to-be-heated battery outputs a discharging current to the power supply in a second time segment by using the voltage conversion unit.

Optionally, the battery heating system may be applied to an in-vehicle system, a mobile terminal, an outdoor energy storage system, or the like. The power supply and the to-be-heated battery may be different batteries in a same power supply system.

Optionally, the battery heating system may be applied to an in-vehicle system in fields such as a pure electric vehicle (EV)/battery EV, a hybrid electric vehicle (HEV), a range extended electric vehicle (REEV), a plug-in hybrid electric vehicle (PHEV), and a new energy vehicle (NEV).

For example, the power supply and the to-be-heated battery may be different battery modules in a same battery pack in an in-vehicle system.

For example, the power supply and the to-be-heated battery may be different battery packs in an in-vehicle system. The power supply may include one or more battery modules, and the to-be-heated battery may include one or more battery modules.

For example, the power supply and the to-be-heated battery may be different battery packs in different in-vehicle systems.

For example, the power supply and the to-be-heated battery may be different batteries or battery modules in a same mobile terminal, or the power supply and the to-be-heated battery may be batteries or battery modules in different mobile terminals.

For example, the power supply and the to-be-heated battery may be separately different batteries in an outdoor energy storage system.

In this embodiment of this application, the to-be-heated battery may alternately implement a charging process and a discharging process by using the voltage conversion unit, so that the to-be-heated battery is heated by using Joule heat generated by an internal resistance of the to-be-heated battery in the charging/discharging process. This heating manner may be used to quickly and evenly heat a battery. This heating manner can mitigate a problem that heating is uneven when the outside of the battery is heated, heating efficiency is low, space is occupied, and a lifespan of the battery is greatly affected.

With reference to the first aspect, in a possible implementation of the first aspect, the control unit is further configured to output the control signal when the temperature monitoring signal indicates that the temperature of the to-be-heated battery is lower than a preset threshold. The control unit is further configured to stop outputting the control signal when the temperature monitoring signal indicates that the temperature of the to-be-heated battery is higher than or equal to the preset threshold.

Optionally, the control unit is further configured to, when the temperature monitoring signal indicates that the temperature of the to-be-heated battery is lower than the preset threshold, output the control signal indicating to perform heating.

Optionally, the control unit is further configured to, when the temperature monitoring signal indicates that the temperature of the to-be-heated battery is higher than or equal to the preset threshold, output the control signal indicating to stop performing heating. The voltage conversion unit is configured to stop, based on the control signal, performing boosting or bucking processing on the first voltage, and/or stop, based on the control signal, performing boosting or bucking processing on the second voltage.

With reference to the first aspect, in a possible implementation of the first aspect, the control signal is used to control a charging/discharging frequency of the to-be-heated battery, so that the charging/discharging frequency of the to-be-heated battery falls within a frequency range of a dynamic control area.

With reference to the first aspect, in a possible implementation of the first aspect, the control unit is configured to determine, based on the temperature that is of the to-be-heated battery and that is indicated by the temperature monitoring signal and a preset correspondence between a battery temperature and the frequency range of the dynamic control area, a first frequency range that is of the dynamic control area and that corresponds to the temperature of the to-be-heated battery. The control unit is further configured to determine the charging/discharging frequency of the to-be-heated battery based on the first frequency range.

With reference to the first aspect, in a possible implementation of the first aspect, the system further includes an impedance monitoring unit. The impedance monitoring unit is configured to monitor an impedance of the to-be-heated battery, and output an impedance monitoring signal, where the impedance monitoring signal is used to indicate the impedance of the to-be-heated battery. The control unit is configured to receive the impedance monitoring signal, and determine, based on the impedance monitoring signal, a second frequency range that is of the dynamic control area and that corresponds to the to-be-heated battery in a current status. The control unit is further configured to determine the charging/discharging frequency of the to-be-heated battery based on the second frequency range.

With reference to the first aspect, in a possible implementation of the first aspect, the voltage conversion unit is configured to perform boosting or bucking processing on the first voltage or perform boosting or bucking processing on the second voltage, so that a charging current received by the to-be-heated battery in the first time segment is less than a maximum charging current.

With reference to the first aspect, in a possible implementation of the first aspect, the control unit is further configured to determine a current value of a current maximum charging current of the to-be-heated battery based on a state of charge and the temperature that is of the to-be-heated battery and that is indicated by the temperature monitoring signal.

With reference to the first aspect, in a possible implementation of the first aspect, the system further includes an impedance monitoring unit. The impedance monitoring unit is configured to monitor an impedance of the to-be-heated battery, and output an impedance monitoring signal, where the impedance monitoring signal is used to indicate the impedance of the to-be-heated battery. The control unit is configured to receive the impedance monitoring signal, and determine a current value of the maximum charging current based on the impedance monitoring signal.

With reference to the first aspect, in a possible implementation of the first aspect, the voltage conversion unit is configured to perform boosting or bucking processing on the first voltage or perform boosting or bucking processing on the second voltage, so that a discharging current that is output by the to-be-heated battery in the second time segment is less than a maximum discharging current.

With reference to the first aspect, in a possible implementation of the first aspect, the control unit is further configured to determine a current value of a current maximum discharging current of the to-be-heated battery based on the temperature of the to-be-heated battery and a state of charge.

With reference to the first aspect, in a possible implementation of the first aspect, the system further includes an impedance monitoring unit. The impedance monitoring unit is configured to monitor an impedance of the to-be-heated battery, and output an impedance monitoring signal, where the impedance monitoring signal is used to indicate the impedance of the to-be-heated battery. The control unit is configured to receive the impedance monitoring signal, and determine a current value of the maximum discharging current based on the impedance monitoring signal.

With reference to the first aspect, in a possible implementation of the first aspect, the power supply includes a first battery module, and the to-be-heated battery includes a second battery module.

According to a second aspect, a method for controlling a battery heating system is provided. The battery heating system includes a temperature monitoring unit configured to monitor a temperature of a to-be-heated battery, and output a temperature monitoring signal, where the temperature monitoring signal is used to indicate the temperature of the to-be-heated battery, and a voltage conversion unit, separately connected to a power supply and the to-be-heated battery, and configured to receive a first voltage that is input by the power supply or a second voltage that is input by the to-be-heated battery. The method includes obtaining the temperature monitoring signal, determining a control signal based on the temperature monitoring signal, and outputting the control signal to the voltage conversion unit, where the control signal is used to control the voltage conversion unit to perform boosting or bucking processing on the first voltage or perform boosting or bucking processing on the second voltage, so that the to-be-heated battery receives a charging current from the power supply in a first time segment by using the voltage conversion unit, and the to-be-heated battery outputs a discharging current to the power supply in a second time segment by using the voltage conversion unit.

In this embodiment of this application, the to-be-heated battery may alternately implement a charging process and a discharging process by using the voltage conversion unit, so that the to-be-heated battery is heated by using Joule heat generated by an internal resistance of the to-be-heated battery in the charging/discharging process. This heating manner may be used to quickly and evenly heat a battery. This heating manner can mitigate a problem that heating is uneven when the outside of the battery is heated, heating efficiency is low, space is occupied, and a lifespan of the battery is greatly affected.

With reference to the second aspect, in a possible implementation of the second aspect, the outputting the control signal to the voltage conversion unit includes outputting the control signal when the temperature monitoring signal indicates that the temperature of the to-be-heated battery is lower than a preset threshold. The method further includes stopping outputting the control signal when the temperature monitoring signal indicates that the temperature of the to-be-heated battery is higher than or equal to the preset threshold.

Optionally, the outputting the control signal to the voltage conversion unit includes, when the temperature monitoring signal indicates that the temperature of the to-be-heated battery is lower than the preset threshold, outputting the control signal indicating to perform heating.

Optionally, the method further includes, when the temperature monitoring signal indicates that the temperature of the to-be-heated battery is higher than or equal to the preset threshold, outputting the control signal indicating to stop performing heating. The voltage conversion unit is configured to stop, based on the control signal, performing boosting or bucking processing on the first voltage, and/or stop, based on the control signal, performing boosting or bucking processing on the second voltage.

With reference to the second aspect, in a possible implementation of the second aspect, the control signal is used to control a charging/discharging frequency of the to-be-heated battery, so that the charging/discharging frequency of the to-be-heated battery falls within a frequency range of a dynamic control area.

With reference to the second aspect, in a possible implementation of the second aspect, the method further includes determining, based on the temperature that is of the to-be-heated battery and that is indicated by the temperature monitoring signal and a preset correspondence between a battery temperature and the frequency range of the dynamic control area, a first frequency range that is of the dynamic control area and that corresponds to the temperature of the to-be-heated battery, and determining the charging/discharging frequency of the to-be-heated battery based on the first frequency range.

With reference to the second aspect, in a possible implementation of the second aspect, the battery heating system further includes an impedance monitoring unit. The impedance monitoring unit is configured to monitor an impedance of the to-be-heated battery, and output an impedance monitoring signal, where the impedance monitoring signal is used to indicate the impedance of the to-be-heated battery. The method further includes obtaining the impedance monitoring signal, determining, based on the impedance monitoring signal, a second frequency range that is of the dynamic control area and that corresponds to the to-be-heated battery in a current status, and determining the charging/discharging frequency of the to-be-heated battery based on the second frequency range.

With reference to the second aspect, in a possible implementation of the second aspect, the control signal is used to control the voltage conversion unit to perform boosting or bucking processing on the first voltage or perform boosting or bucking processing on the second voltage, so that a charging current received by the to-be-heated battery in the first time segment is less than a maximum charging current.

With reference to the second aspect, in a possible implementation of the second aspect, the method further includes determining a current value of a current maximum charging current of the to-be-heated battery based on a state of charge and the temperature that is of the to-be-heated battery and that is indicated by the temperature monitoring signal.

With reference to the second aspect, in a possible implementation of the second aspect, the battery heating system further includes an impedance monitoring unit. The impedance monitoring unit is configured to monitor an impedance of the to-be-heated battery, and output an impedance monitoring signal, where the impedance monitoring signal is used to indicate the impedance of the to-be-heated battery. The method further includes obtaining the impedance monitoring signal, and determining a current value of the maximum charging current based on the impedance monitoring signal.

With reference to the second aspect, in a possible implementation of the second aspect, the control signal is used to control the voltage conversion unit to perform boosting or bucking processing on the first voltage or perform boosting or bucking processing on the second voltage, so that a discharging current that is output by the to-be-heated battery in the second time segment is less than a maximum discharging current.

With reference to the second aspect, in a possible implementation of the second aspect, the method further includes determining a current value of a current maximum discharging current of the to-be-heated battery based on the temperature of the to-be-heated battery and a state of charge.

With reference to the second aspect, in a possible implementation of the second aspect, the battery heating system further includes an impedance monitoring unit. The impedance monitoring unit is configured to monitor an impedance of the to-be-heated battery, and output an impedance monitoring signal, where the impedance monitoring signal is used to indicate the impedance of the to-be-heated battery. The method further includes obtaining the impedance monitoring signal, and determining a current value of the maximum discharging current based on the impedance monitoring signal.

With reference to the second aspect, in a possible implementation of the second aspect, the power supply includes a first battery module, and the to-be-heated battery includes a second battery module.

According to a third aspect, a power supply system is provided, and the power supply system includes the battery heating system according to the first aspect or any one of the possible implementations of the first aspect, and the power supply and the to-be-heated battery.

Optionally, the power supply system may include an in-vehicle system, a mobile terminal, an outdoor energy storage system, or the like. The power supply and the to-be-heated battery may be different batteries in a same power supply system. The power supply may include one or more battery modules, and the to-be-heated battery may include one or more battery modules.

For example, the power supply and the to-be-heated battery may be different battery modules in a same battery pack in an in-vehicle system.

For example, the power supply and the to-be-heated battery may be different battery packs in an in-vehicle system.

For example, the power supply and the to-be-heated battery may be different battery packs in different in-vehicle systems.

For example, the power supply and the to-be-heated battery may be different battery modules in a same mobile terminal, or the power supply and the to-be-heated battery may be batteries or battery modules in different mobile terminals.

For example, the power supply and the to-be-heated battery may be separately different batteries in an outdoor energy storage system.

With reference to the third aspect, in a possible implementation of the third aspect, the power supply includes a first battery module, and the to-be-heated battery includes a second battery module.

According to a fourth aspect, an in-vehicle system is provided, and the in-vehicle system includes the battery heating system according to the first aspect or any one of the possible implementations of the first aspect, and the power supply and the to-be-heated battery.

With reference to the fourth aspect, in a possible implementation of the fourth aspect, the power supply includes a first battery module in a battery pack in the in-vehicle system, and the to-be-heated battery includes a second battery module in the battery pack.

According to a fifth aspect, a control device is provided, including a processor, where the processor is configured to perform the method according to the second aspect or any one of the possible implementations of the second aspect. Further, the control device includes a memory. The memory is coupled to the processor, and the memory is configured to store a computer program. The processor is configured to execute the computer program, so that the control device performs the method according to the second aspect or any one of the possible implementations of the second aspect.

According to a sixth aspect, a computer-readable medium is provided, including a computer program. When the computer program is executed on a computer, the computer is enabled to perform the method according to the second aspect or any one of the possible implementations of the second aspect.

According to a seventh aspect, a control device is provided. The control device includes a unit configured to perform the method according to the second aspect or any one of the possible implementations of the second aspect. A function of the unit may be implemented by hardware, or may be implemented by executing corresponding software by hardware. It should be understood that, the term "unit" herein may refer to an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function.

In the embodiments of this application, the control unit may be a chip or a chip system, such as a system on chip.

According to an eighth aspect, a chip is provided, and a processing circuit is disposed on the chip. The processing circuit is configured to perform the method according to the second aspect or any one of the possible implementations of the second aspect.

According to a ninth aspect, an electric vehicle is provided, including a first battery and a second battery, a voltage conversion unit, separately connected to the first battery and the second battery, and configured to receive a first voltage that is input by the first battery or a second voltage that is input by the second battery, a temperature monitoring unit configured to monitor a temperature of the second battery, and output a temperature monitoring signal, where the temperature monitoring signal is used to indicate the temperature of the second battery, and a control unit configured to receive the temperature monitoring signal, and output a control signal to the voltage conversion unit based on the temperature monitoring signal. The voltage conversion unit is configured to perform boosting or bucking processing on the first voltage based on the control signal or perform boosting or bucking processing on the second voltage based on the control signal, so that the second battery receives a charging current from the first battery in a first time segment by using the voltage conversion unit, and the second battery outputs a discharging current to the first battery in a second time segment by using the voltage conversion unit.

Optionally, the electric vehicle may include a pure EV/battery EV, an HEV, an REEV, a PHEV, an NEV, and the like.

For example, the first battery and the second battery may be different battery modules in a same battery pack in the electric vehicle. The first battery may include one or more battery modules, and the second battery may include one or more battery modules.

For example, the first battery and the second battery may be different battery packs in the electric vehicle.

Alternatively, the first battery and the second battery may be different battery packs in different electric vehicles. For example, the second battery may be a battery pack in the electric vehicle in the first aspect, and the first battery may be a battery pack in another electric vehicle.

Alternatively, the first battery may be an external power supply, such as an external direct-current power supply, and the second battery may be a battery pack in the electric vehicle.

In this embodiment of this application, the first battery and the second battery may alternately implement a charging process and a discharging process by using the voltage conversion unit, so that the first battery and the second battery are heated by using Joule heat generated by internal resistances of the first battery and the second battery in the charging/discharging process. This heating manner may be used to quickly and evenly heat a battery. This heating manner can mitigate a problem that heating is uneven when the outside of the battery is heated, heating efficiency is low, space is occupied, and a lifespan of the battery is greatly affected.

With reference to the ninth aspect, in some possible implementations of the ninth aspect, the control unit is further configured to output the control signal when the temperature monitoring signal indicates that the temperature of the second battery is lower than a preset threshold. The control unit is further configured to stop outputting the control signal when the temperature monitoring signal indicates that the temperature of the second battery is higher than or equal to the preset threshold.

With reference to the ninth aspect, in some possible implementations of the ninth aspect, the control signal is used to control a charging/discharging frequency of the second battery, so that the charging/discharging frequency of the second battery falls within a frequency range of a dynamic control area.

With reference to the ninth aspect, in some possible implementations of the ninth aspect, the control unit is configured to determine, based on the temperature that is of the second battery and that is indicated by the temperature monitoring signal and a preset correspondence between a battery temperature and the frequency range of the dynamic control area, a first frequency range that is of the dynamic control area and that corresponds to the temperature of the second battery. The control unit is further configured to determine the charging/discharging frequency of the second battery based on the first frequency range.

With reference to the ninth aspect, in some possible implementations of the ninth aspect, the vehicle further includes an impedance monitoring unit. The impedance monitoring unit is configured to monitor an impedance of the second battery, and output an impedance monitoring signal, where the impedance monitoring signal is used to indicate the impedance of the second battery. The control unit is configured to receive the impedance monitoring signal, and determine, based on the impedance monitoring signal, a second frequency range that is of the dynamic control area and that corresponds to the second battery in a current status. The control unit is further configured to determine the charging/discharging frequency of the second battery based on the second frequency range.

With reference to the ninth aspect, in some possible implementations of the ninth aspect, the voltage conversion unit is configured to perform boosting or bucking processing on the first voltage or perform boosting or bucking processing on the second voltage, so that a charging current received by the second battery in the first time segment is less than a maximum charging current.

With reference to the ninth aspect, in some possible implementations of the ninth aspect, the voltage conversion unit is configured to perform boosting or bucking processing on the first voltage or perform boosting or bucking processing on the second voltage, so that a discharging current that is output by the second battery in the second time segment is less than a maximum discharging current.

With reference to the ninth aspect, in some possible implementations of the ninth aspect, the vehicle further includes a battery pack, the first battery includes at least one first battery module in the battery pack, and the second battery includes at least one second battery module in the battery pack.

BRIEF DESCRIPTION OF DRAWINGS

FIG. 15 is a schematic diagram of a method for controlling a battery heating system according to an embodiment of this application; and FIG. 16 is a schematic diagram of a structure of a control device according to an embodiment of this application.

DESCRIPTION OF EMBODIMENTS

Figure 1:
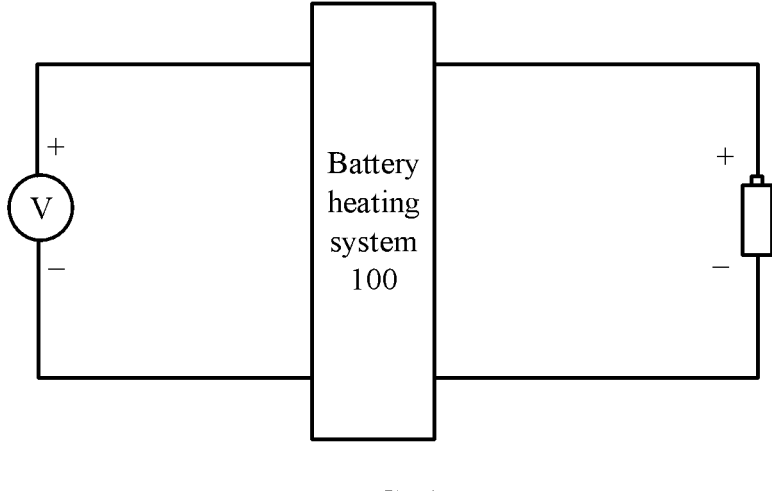
FIG. 1 is a schematic diagram of a structure of a battery heating system according to an embodiment of this application.

The following describes the technical solutions in this application with reference to the accompanying drawings.

For ease of understanding, several terms or concepts related to the embodiments of this application are first described below.

A lithium-ion battery (or lithium-ion cell) is an apparatus that implements mutual conversion between chemical energy and electric energy by relying on movement of a lithium ion between a positive electrode and a negative electrode. The apparatus includes an electrode, a diaphragm, an electrolyte, a housing, a terminal, and the like, and is designed to be rechargeable. In the embodiments of this application, the lithium-ion battery may also be referred to as an electrochemical cell, a mono-cell battery, or the like.

A lithium-ion battery module (or lithium-ion cell module) is a combination that combines more than one cell in a series, in parallel, or in series and parallel and that is used as a power supply. The lithium-ion battery module has only one pair of positive-electrode and negative-electrode output terminals, and may also be referred to as a battery module, or the like in the embodiments of this application.

A battery management system (BMS) is a system for managing a battery, and usually includes a monitoring module and an operation control module. The BMS mainly includes two parts: a battery monitoring unit (BMU) and a battery control unit (BCU).

A lithium-ion battery pack or (lithium-ion pack) is a unit that can obtain electric energy from the outside and output electric energy to the outside, and usually includes at least one lithium-ion battery module, a lithium-ion battery management module (a BCU is not included), a lithium-ion battery box, and a corresponding accessory.

A lithium-ion battery system (or lithium-ion system) is an energy storage apparatus, and usually includes one or more lithium-ion battery packs and a corresponding accessory. The accessory may include a battery management system, a high voltage circuit, a low voltage circuit, a heat management device, a mechanical assembly, and the like.

A Faraday reaction, also referred to as an electrochemical reaction, means that two processes simultaneously occur on an electrode, where one process is charge transfer and the other process is substance diffusion and transfer. Charge transfer may mean that a charge is transferred in a metal-solution interface, and substance diffusion and transfer may mean that electron transfer causes an oxidation or reduction reaction. These reactions are referred to as Faraday reactions because these reactions comply with the Faraday's law, that is, a quantity of chemical reactions caused by passing of a current is proportional to an amount of passed electricity.

A lithium plating reaction means that in a process of charging a lithium-ion battery, a lithium ion is extracted from a positive electrode and inserted into a negative electrode. However, when some abnormal conditions occur, and the lithium ion extracted from the positive electrode cannot be inserted into the negative electrode, the lithium ion can be only plated on a surface of the negative electrode. This is referred to as the lithium plating reaction. For example, the lithium ion may generate the lithium plating reaction when being charged at a low temperature.

FIG. 1 is a schematic diagram of a structure of a battery heating system 100 according to an embodiment of this application. As shown in FIG. 1, the system 100 is connected to a power supply 20 and a to-be-heated battery 30, and is configured to heat the to-be-heated battery 30 at a low temperature. It should be noted that the solutions in the embodiments of this application may be widely applied to an in-vehicle system, a mobile terminal, an outdoor energy storage system, and the like. Alternatively, the battery heating system 100 in this embodiment of this application may be further applied to another field in which a battery needs to be heated. The outdoor energy storage system may include a standby power supply system of a base station and the like.

In some examples, the power supply 20 and the to-be-heated battery 30 may be different batteries in a same power supply system, and the power supply system may be an in-vehicle system, a mobile terminal, or an outdoor energy storage system.

In some examples, the battery heating system may be applied to an in-vehicle system in fields such as a pure EV/battery EV, an HEV, an REEV, a PHEV, and an NEV.

In some examples, the power supply 20 and the to-be-heated battery 30 may be different battery modules in a same battery pack in an in-vehicle system. Charging and discharging may be performed between the different battery modules by using the battery heating system 100, and the batteries are simultaneously heated. The battery module may include the foregoing lithium-ion battery module, and the battery pack may include the foregoing lithium-ion battery pack. The in-vehicle system may include the foregoing lithium-ion battery system.

In some examples, the power supply 20 and the to-be-heated battery 30 may be different battery packs in an in-vehicle system, for example, the different battery packs may correspond to a high-voltage power supply system and a low-voltage power supply system in the in-vehicle system.

In some examples, the power supply 20 and the to-be-heated battery 30 may be different battery packs in different in-vehicle systems. In other words, charging and discharging may be performed between different vehicles by using the battery heating system 100.

In some examples, the power supply 20 and the to-be-heated battery 30 may be different battery modules in a same mobile terminal, or the power supply 20 and the to-be-heated battery 30 may be batteries or battery modules in different mobile terminals.

In some examples, the power supply 20 and the to-be-heated battery 30 may be separately different batteries in an outdoor energy storage system.

Figure 2:
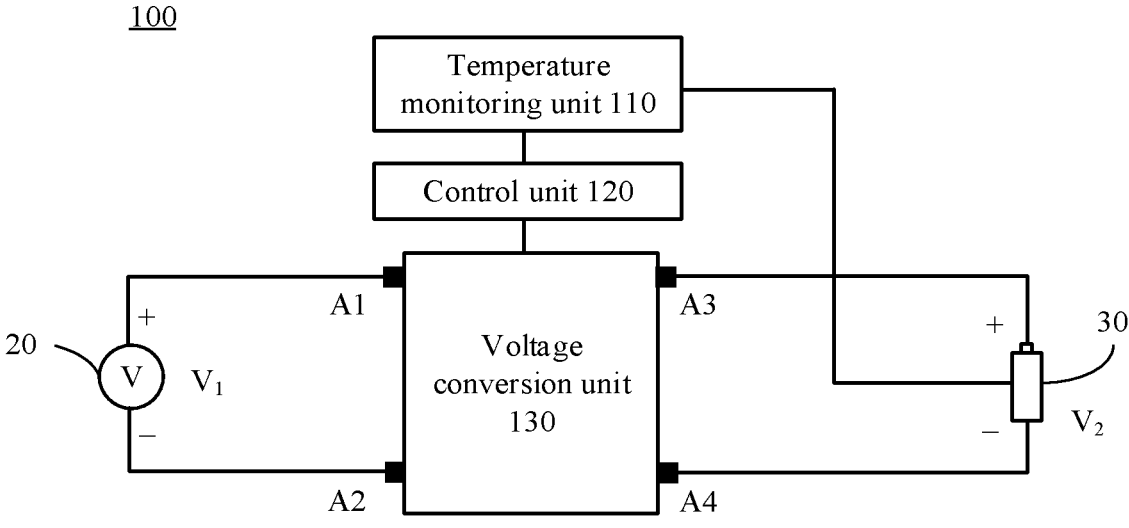
FIG. 2 is a schematic diagram of a structure of a battery heating system according to another embodiment of this application.

FIG. 2 is a schematic diagram of a structure of a battery heating system 100 according to another embodiment of this application. As shown in FIG. 2, the battery heating system 100 may include a temperature monitoring unit 110, a control unit 120, and a voltage conversion unit 130.

The temperature monitoring unit 110 is configured to monitor a temperature of the to-be-heated battery 30, and output a temperature monitoring signal, where the temperature monitoring signal is used to indicate the temperature of the to-be-heated battery 30.

For example, the temperature monitoring signal that is output by the temperature monitoring unit 110 may be a digital signal, or may be an analog signal. The temperature monitoring unit 110 may include a temperature sensor, and the temperature sensor may include a thermocouple, a negative temperature coefficient (NTC) temperature sensor, an infrared sensor, or the like. The temperature sensor may be disposed around the to-be-heated battery 30.

Optionally, the temperature monitoring signal may indicate a current temperature or a real-time temperature of the to-be-heated battery 30. It can be understood by a person skilled in the art that in some scenarios, depending on a specific manner of detecting a temperature by the temperature monitoring unit 110, the current temperature or the real-time temperature of the to-be-heated battery 30 may include an average temperature that is of the to-be-heated battery 30 and that is monitored in a latest time interval, or a temperature that is of the to-be-heated battery 30 and that is monitored before the latest time interval. A length of the latest time interval may be determined based on practice. For example, the temperature monitoring unit may monitor the temperature of the to-be-heated battery 30, and output the temperature monitoring signal every 5 seconds (s). Alternatively, the temperature monitoring unit may continuously output the temperature monitoring signal in time domain.

In some specific examples, the temperature monitoring unit 110 may be implemented by a temperature sensor, or may be jointly implemented by an interface circuit of the control unit 120 and a temperature sensor. The interface circuit is connected to the temperature sensor, receives a sensing signal from the temperature sensor, and determines the temperature of the to-be-heated battery 30 based on the sensing signal.

The control unit 120 is configured to receive the temperature monitoring signal, and output a control signal to the voltage conversion unit 130 based on the temperature monitoring signal.

Optionally, the control unit 120 may determine a working mode of the battery heating system 100 based on the temperature indicated by the received temperature monitoring signal. For example, if the temperature of the to-be-heated battery 30 meets a normal working requirement, the control signal may indicate the voltage conversion unit 130 not to work. Alternatively, if the temperature of the to-be-heated battery 30 is lower than the normal working requirement, the control signal may indicate the voltage conversion unit 130 to work. Optionally, the control unit 120 may indicate, by sending the control signal, the voltage conversion unit 130 to work, or indicate, by skipping sending the control signal, the voltage conversion unit 130 not to work.

The voltage conversion unit 130 is separately connected to the power supply 20 and the to-be-heated battery 30, and receives a first voltage $V_1$ that is input by the power supply 20 or a second voltage $V_2$ that is input by the to-be-heated battery 30. The voltage conversion unit is configured to perform boosting or bucking processing on the first voltage $V_1$ based on the control signal or perform boosting or bucking processing on the second voltage $V_2$ based on the control signal, so that the to-be-heated battery receives a charging current from the power supply in a first time segment by using the voltage conversion unit, and the to-be-heated battery outputs a discharging current to the power supply in a second time segment by using the voltage conversion unit.

Optionally, the first voltage $V_1$ may be understood as a working voltage provided by the power supply 20, and the second voltage $V_2$ may be understood as a working voltage provided by the to-be-heated battery 30.

Optionally, the power supply 20 may include a direct-current power supply. For example, the power supply 20 may include a battery, or the power supply 20 may be a direct-current power supply obtained after alternating-current/direct-current conversion is performed on an alternating-current power supply. For example, a direct-current power supply may be obtained after alternating-current/direct-current conversion is performed on 50 hertz (Hz) mains electricity.

As shown in FIG. 2, the voltage conversion unit 130 may include a first terminal A1, a second terminal A2, a third terminal A3, and a fourth terminal A4. The first terminal A1 and the second terminal A2 are respectively configured to connect to a positive electrode and a negative electrode of the power supply 20. The third terminal A3 and the fourth terminal A4 may be respectively configured to connect to a positive electrode and a negative electrode of the to-be-heated battery 30. The first terminal A1 and the second terminal A2 may be collectively referred to as a first end of the voltage conversion unit 130, and the third terminal A3 and the fourth terminal A4 may be collectively referred to as a second end of the voltage conversion unit 130. The voltage conversion unit 130 may be an apparatus in which a direct current can flow between the first end and the second end in dual directions.

The voltage conversion unit 130 may perform boosting/bucking processing on the first voltage $V_1$ or the second voltage $V_2$, so that charging and discharging are continuously performed between the to-be-heated battery 30 and the power supply 20, and the to-be-heated battery can heat itself based on Joule heat generated by the charging/discharging current. In other words, a battery is quickly and evenly heated by using Joule heat generated by an internal resistance of the battery.

In some examples, the voltage conversion unit 130 may control the to-be-heated battery 30 to be charged or discharge electricity based on a specific charging/discharging frequency. The first time segment may be a time interval used to charge the to-be-heated battery in a charging and discharging time period, and the second time segment may be a time interval used by the to-be-heated battery to discharge electricity in a charging and discharging time period. In the first time segment, the power supply 20 is in a discharging state, and the to-be-heated battery 30 is in a charging state. In the second time segment, the to-be-heated battery 30 is in a discharging state, and the power supply 20 is in a charging state. Alternatively, the power supply 20 charges the to-be-heated battery 30 in the first time segment by using the voltage conversion unit 130, and the to-be-heated battery 30 charges the power supply 20 in the second time segment by using the voltage conversion unit 130. The power supply 20 and the to-be-heated battery 30 may alternately charge each other and discharge electricity to each other until the to-be-heated battery is heated to a target temperature.

Optionally, the voltage conversion unit 130 further includes a control end, and the control end is configured to receive a control signal. The control signal is used to control the voltage conversion unit to perform boosting/bucking processing on an input voltage that is input by an input end, and output a boosted/bucked voltage by using another input end.

In this embodiment of this application, alternating-current charging/discharging is performed on the to-be-heated battery to directly heat the battery from the inside of the battery. In this method, a large current may be selected to perform heating, and an internal resistance of the battery is high in a low temperature condition, so that a heat generation amount is high, and the temperature of the battery can quickly rise.

In addition, in the solution in this embodiment of this application, the inside of an electrochemical cell of the battery participates in heat generation, and heat can be evenly distributed inside the entire battery, so that heating is even, thereby mitigating a problem of uneven heating caused by single-side heating in a conventional heating method.

In addition, in the solution in this embodiment of this application, the inside of the battery is heated, and only the electrochemical cell is heated without heating an external component. Therefore, energy utilization is high.

Figure 3:
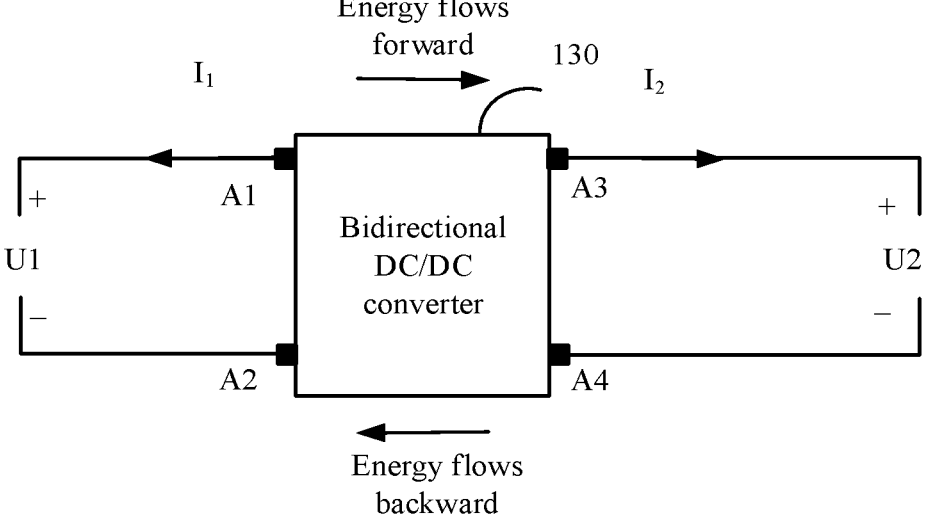
FIG. 3 is a schematic diagram of a structure of a bidirectional direct current (DC)/DC converter according to an embodiment of this application.

Optionally, the voltage conversion unit 130 may include a bidirectional DC/DC converter. The bidirectional DC/DC converter may implement bidirectional flowing of a direct current, or may implement bidirectional energy transmission. For example, FIG. 3 is a schematic diagram of a structure of a bidirectional DC/DC converter according to an embodiment of this application. As shown in FIG. 3, the bidirectional DC/DC converter includes two ends. A first end U1 includes a first terminal A1 and a second terminal A2. A second end U2 may include a third terminal A3 and a fourth terminal A4. The first terminal A1 and the third terminal A3 are positive terminals, and the second terminal A2 and the fourth terminal A4 are negative terminals. An output current of the U1 end is represented by a first current $I_1$, and an output current of the U2 end is represented by a second current $I_2$. When energy is transmitted from the U1 end to the U2 end, the energy is transmitted forward, and a current direction is that $I_1<0$ and $12>0$. When the energy is transmitted from the U2 end to the U1 end, the energy is transmitted backward, and the current direction is that $I_1>0$ and $I_2<0$.

Figure 4:
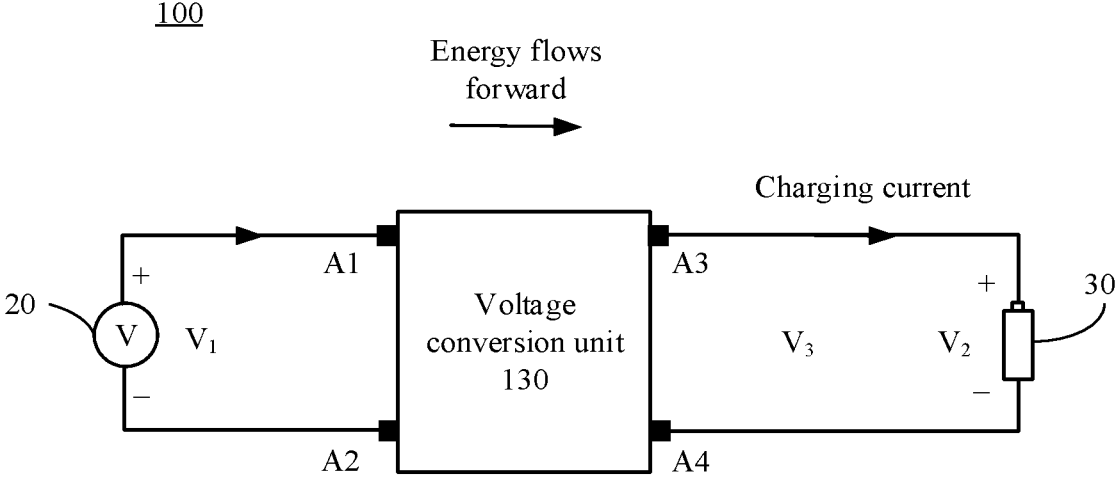
FIG. 4 is a schematic diagram of a working status of a voltage conversion unit according to an embodiment of this application.

FIG. 4 is a schematic diagram of a working status of a voltage conversion unit 130 according to an embodiment of this application. As shown in FIG. 4, the voltage conversion unit 130 performs boosting or bucking processing on the first voltage $V_1$ that is input by the power supply 20, and outputs a third voltage $V_3$, where the third voltage $V_3$ is used to be loaded at the two ends of the to-be-heated battery 30. If the third voltage $V_3$ is greater than the second voltage $V_2$, the power supply 20 charges the to-be-heated battery 30 by using the voltage conversion unit 130, or if the third voltage $V_3$ is less than the second voltage $V_2$, the to-be-heated battery 30 discharges electricity to the power supply 20 by using the voltage conversion unit 130.

For example, if $V_1=18$ V, $V_2=18$ V, and $V_3=19.5$ V, $V_3$ is greater than $V_2$, and the power supply 20 charges the to-be-heated battery 20 by using the voltage conversion circuit 130. Alternatively, if $V_1=18$ V, $V_2=18$ V, and $V_3=16.5$ V, $V_3$ is less than $V_2$, and the to-be-heated battery 30 discharges electricity to the power supply 20 by using the voltage conversion unit 130.

Figure 5:
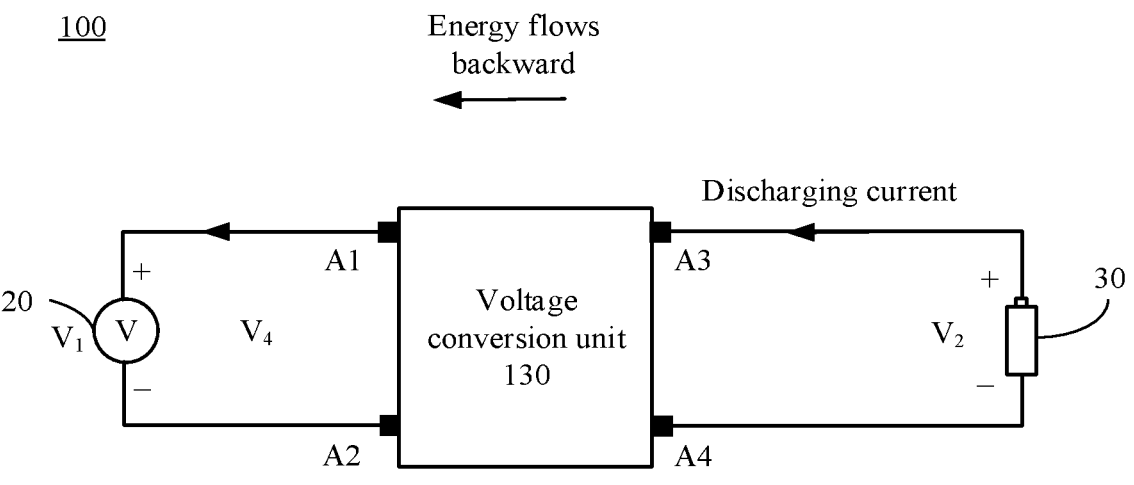
FIG. 5 is a schematic diagram of a working status of a voltage conversion unit according to another embodiment of this application.

FIG. 5 is a schematic diagram of a working status of a voltage conversion unit 130 according to another embodiment of this application. The voltage conversion unit 130 may further perform boosting or bucking processing on the second voltage $V_2$ that is input by the to-be-heated battery 30, and outputs a fourth voltage $V_4$, where the fourth voltage $V_4$ is used to be loaded at the two ends of the power supply 20. If the fourth voltage $V_4$ is greater than the first voltage $V_1$, the to-be-heated battery 30 discharges electricity to the power supply by using the voltage conversion unit 130, or if the fourth voltage $V_4$ is less than the first voltage $V_1$, the power supply 20 charges the to-be-heated battery 30 by using the voltage conversion unit 130.

For example, if $V_1=18$ volts (V), $V_2=18$ V, and $V_4=19.5$ V, $V_4$ is greater than $V_1$, and the to-be-heated battery 30 discharges electricity to the power supply by using the voltage conversion unit 130. Alternatively, if $V_1=18$ V, $V_2=18$ V, and $V_4=16.5$ V, $V_4$ is less than $V_1$, and the power supply 20 charges the to-be-heated battery 30 by using the voltage conversion unit 130.

In this embodiment of this application, the to-be-heated battery 30 may alternately implement a charging process and a discharging process by using the voltage conversion unit 130, so that the to-be-heated battery 30 is heated by using Joule heat generated by an internal resistance of the to-be-heated battery 30 in the charging/discharging process. This heating manner may be used to quickly and evenly heat a battery. This heating manner can mitigate a problem that heating is uneven when the outside of the battery is heated, heating efficiency is low, space is occupied, and a lifespan of the battery is greatly affected.

In addition, it should be noted that when the to-be-heated battery 30 is charged or discharges electricity by using the voltage conversion unit 130, the power supply 20 may also be charged or discharge electricity by using the voltage conversion unit 130. Therefore, when both the power supply 20 and the to-be-heated battery 30 are batteries, the power supply 20 may also perform Ohmic heating on the power supply 20 through charging and discharging.

Figure 6:
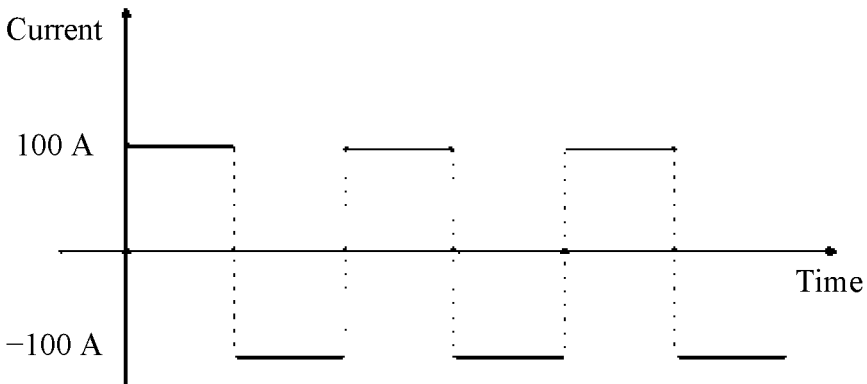
FIG. 6 is a schematic diagram of a charging/discharging current of a battery according to an embodiment of this application.

FIG. 6 is a schematic diagram of a charging/discharging current of a battery according to an embodiment of this application. As shown in FIG. 6, an alternating-current pulse current of a specific frequency is applied to the battery to perform charging and discharging on the battery, so that the battery can be charged and discharge electricity in a short time period, and the battery is quickly and evenly heated by using Joule heat generated by an internal resistance of the battery. In addition, an alternating-current pulse is used, and a total amount of electricity injected into the battery or electricity flowing out of the battery in a heating process is approximately equal to zero. Therefore, working performance of the battery is not affected.

Power for generating Joule heat when a current flows through the battery may be represented by the following formula (1).

$$Q=I_2R \qquad (1)$$

Q represents power of the battery, I represents a charging current or a discharging current, and R represents an internal resistance of the battery.

Optionally, the control unit 120 is further configured to output the control signal when the temperature monitoring signal indicates that the temperature of the to-be-heated battery 30 is lower than a preset threshold, and/or stop outputting the control signal when the temperature monitoring signal indicates that the temperature of the to-be-heated battery is higher than or equal to the preset threshold.

The preset threshold may be determined based on a critical temperature at which the to-be-heated battery can work normally. When the temperature of the to-be-heated battery is lower than the critical temperature, performance of the to-be-heated battery deteriorates. For example, an available capacity of the to-be-heated battery greatly decreases or activity of the battery is reduced, or a lithium plating reaction occurs during charging. The preset threshold may be greater than or equal to the critical temperature. For example, the preset threshold may be set to 0 degree Celsius (° C.), 5° C., or 10° C., or may be set to any temperature ranging from 0° C. to 15° C.

Optionally, when the control unit 120 outputs the control signal, the voltage conversion unit 130 performs charging/discharging processing on the to-be-heated battery based on the control signal. When the control unit stops outputting the control signal, the voltage conversion unit 130 does not receive the control signal. Therefore, the voltage conversion unit 130 is in an idle state, and does not perform charging/discharging processing on the to-be-heated battery 30, that is, the to-be-heated battery 30 does not need to be heated.

Optionally, the control signal is used to control a charging/discharging frequency of the to-be-heated battery 30, so that the charging/discharging frequency of the to-be-heated battery 30 falls within a frequency range of a dynamic control area. When the charging/discharging frequency of the to-be-heated battery 30 falls within the frequency range of the dynamic control area, only charge transfer occurs inside the to-be-heated battery 30, and there is no substance diffusion and transfer or a Faraday reaction does not occur. Therefore, when the charging/discharging frequency of the battery falls within the frequency range of the dynamic control area, a low-temperature lithium plating reaction hardly occurs.

Figure 7:
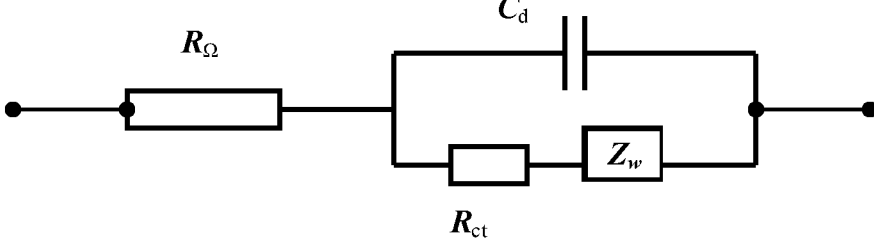
FIG. 7 shows an equivalent circuit model of a battery according to an embodiment of this application.

To help describe a concept of the dynamic control area, an electrochemical implementation principle of a battery in the embodiments of this application is described below with reference to the accompanying drawings. FIG. 7 shows an equivalent circuit model of a battery according to an embodiment of this application. As shown in FIG. 7, the equivalent circuit model of the battery includes a battery internal resistance $R_\Omega$, a double-layer capacitance $C_d$, a charge transfer resistance $R_{ct}$, and a diffusion impedance $Z_w$. An impedance Z of the battery may be represented by Formula (2).

$$Z = R_\Omega + \left( \frac{1}{j\omega C_d} \right) \| (R_{ct} + Z_w) \qquad (2)$$

In the formula, $\omega$ represents an angular frequency of battery charging/discharging, and j represents an imaginary part of the impedance. The battery internal resistance $R_\Omega$ represents an internal resistance of an electrolyte and an electrode inside the battery. The double-layer capacitance $C_d$ represents an equivalent capacitance formed by an active ion from the electrolyte. The active ion only changes charge distribution without generating a chemical reaction. The charge transfer resistance $R_{ct}$ and the diffusion impedance $Z_w$ may be collectively referred to as Faraday impedance, which is an equivalent impedance formed by an active ion from the electrolyte, and represents a resistance generated by a Faraday reaction. The Faraday reaction includes two processes. One process is charge transfer, and a generated resistance may be represented as Rct. The other process is substance diffusion and transfer, and an impedance generated by the process is represented by $Z_w$. A value of the impedance $Z_w$ may be represented by Formula (3).

$$Z_w=\sigma\omega^{-1/2}(1-j) \qquad (3)$$

In the formula, $\sigma$ represents a factor related to substance transfer, $\omega$ represents the angular frequency of battery charging/discharging, and j represents the imaginary part of the impedance.

Figure 8:
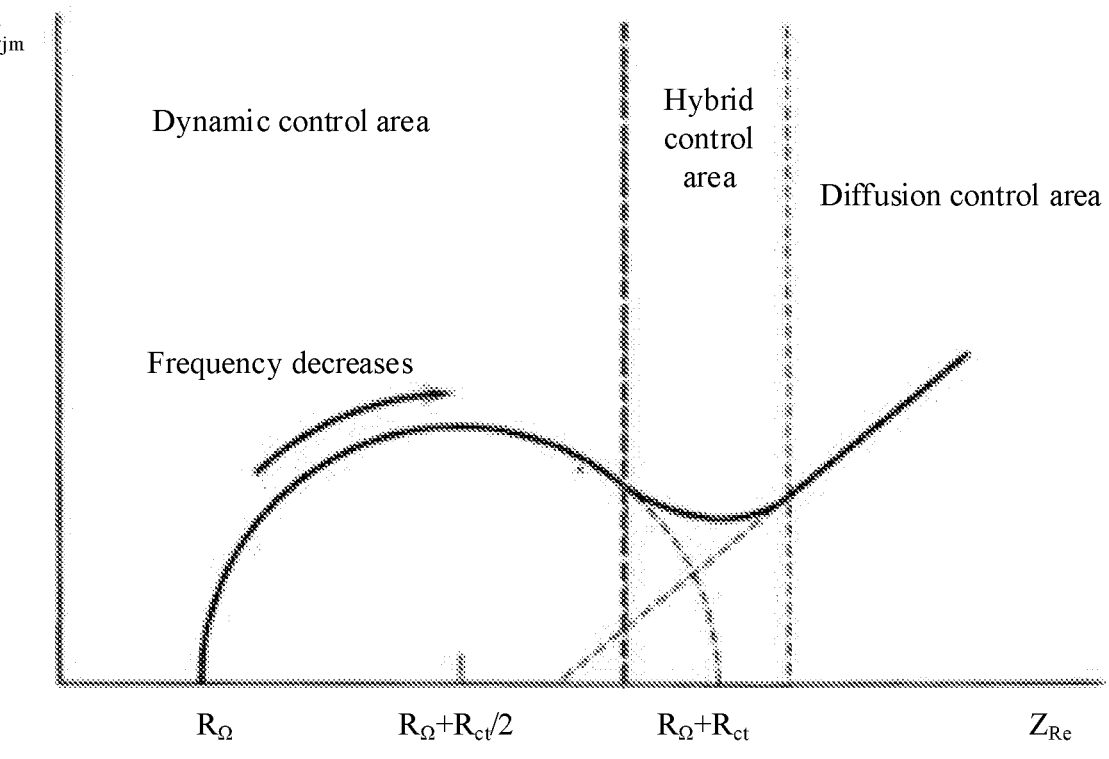
FIG. 8 is a schematic diagram of an electrochemical impedance spectroscopy of a battery according to an embodiment of this application.

FIG. 8 is a schematic diagram of an electrochemical impedance spectroscopy of a battery according to an embodiment of this application. The electrochemical impedance spectroscopy may also be referred to as a Nyquist plot. FIG. 8 shows impedances of the battery at different charging/discharging frequencies. A horizontal axis represents a real-part impedance of the battery, and a vertical axis represents an imaginary-part impedance of the battery. As shown in FIG. 8, the electrochemical impedance spectroscopy is divided into three areas based on different impedance types of the battery: a dynamic control area, a hybrid control area, and a diffusion control area.

In the dynamic control area, a charging/discharging frequency of the battery is relatively high. In a charging/discharging process of the battery, only charge transfer occurs, and there is no substance diffusion and transfer. In other words, the Faraday reaction does not occur in the battery in the dynamic control area. The dynamic control area may include a high frequency area and an extremely high frequency area. In the high frequency area, a charging and discharging time period is relatively short, so that there is not enough time for substance transfer to occur inside the battery. Therefore, the diffusion impedance $Z_w$ caused by substance transfer disappears. In the extremely high frequency area, the double-layer capacitance $C_d$ makes the charge transfer resistance $R_{ct}$ and the diffusion impedance $Z_w$ short-circuited, and the battery presents a pure resistance feature. Therefore, the battery impedance may be represented as $Z=R_\Omega$.

The hybrid control area is a phase in which the battery transits from a non-Faraday reaction to a Faraday reaction. A frequency of the hybrid control area is lower than that of the dynamic control area.

In the diffusion control area, the charging/discharging frequency is relatively low, and both charge transfer and substance diffusion and transfer occur, that is, the Faraday reaction occurs in the charging/discharging process of the battery. A frequency of the diffusion control area is lower than that of the hybrid control area.

It should be noted that a frequency range corresponding to the dynamic control area is not fixed and unchanged, but changes based on different current statuses of the battery. For example, the frequency range of the dynamic control area may change based on a change of a working temperature. For example, Table 1 shows a correspondence between a battery temperature and a battery impedance. As shown in Table 1, when the working temperature is −15° C., the frequency range of the dynamic control area may be a frequency area greater than 4 Hz.

TABLE 1

| Temperature (° C.) | Dynamic control area (Hz) | Hybrid control area (Hz) | Diffusion control area (Hz) |
|---|---|---|---|
| −30 | >1 | 0.02-1 | <0.02 |
| −25 | >2 | 0.04-2 | <0.04 |
| −20 | >3 | 0.07-3 | <0.07 |
| −15 | >4 | 0.11-4 | <0.11 |
| −10 | >6 | 0.15-6 | <0.15 |
| −5 | >8 | 0.21-8 | <0.21 |
| 0 | >10 | 0.25-10 | <0.25 |
| 5 | >12 | 0.34-12 | <0.34 |
| 10 | >15 | 0.52-15 | <0.52 |
| 15 | >20 | 0.78-20 | <0.78 |

In this embodiment of this application, the control unit may control the charging/discharging frequency of the battery to fall within the frequency range of the dynamic control area, so that only charge transfer occurs inside the battery in the charging/discharging process, and there is no substance diffusion and transfer. When the battery is charged at low temperature, a lithium plating reaction is prone to occur. The lithium plating reaction occurs in a substance diffusion and transfer process. Therefore, if substance diffusion and transfer does not occur inside the battery during charging and discharging, battery performance can be avoided from being affected by the lithium plating reaction occurring in the battery.

Therefore, in this embodiment of this application, a proper charging/discharging frequency may be selected in the frequency range of the dynamic control area to perform charging/discharging on the battery, so that the battery can be quickly and evenly heated on the premises that a low-temperature lithium plating reaction is avoided.

It should be noted that theoretically, in the dynamic control area, a higher charging/discharging frequency indicates a lower probability of occurrence of the Faraday reaction. Therefore, the charging/discharging frequency can be set at a higher frequency to more effectively ensure charging performance of the battery. However, in practice, the voltage conversion unit 130 needs to be switched between a charging process and a discharging process, and duration occupied by switch switching makes it difficult to more quickly switch between charging and discharging. Therefore, in practice, the charging/discharging frequency is usually set to be close to a lower limit of the frequency range of the dynamic control area to reduce difficulty of circuit implementation. For example, when the frequency range of the dynamic control area is 2 Hz, the charging/discharging frequency of the battery may be set to a value ranging from 2.5 Hz to 5 Hz.

Optionally, as a temperature changes, the control unit 120 may dynamically adjust the charging/discharging frequency of the battery, to optimize heating efficiency while ensuring security of battery performance. The control unit 120 may determine the charging/discharging frequency of the to-be-heated battery 30 in a plurality of manners, and then control the charging/discharging frequency of the to-be-heated battery 30 by using the control signal sent to the voltage conversion unit 130. Several methods for determining the charging/discharging frequency of the to-be-heated battery 30 are described below.

In a first manner, the control unit 120 may determine, based on the temperature that is of the to-be-heated battery 30 and that is indicated by the temperature monitoring signal and a preset correspondence between a battery temperature and the frequency range of the dynamic control area, a first frequency range corresponding to the temperature of the to-be-heated battery 30. The control unit 120 is further configured to determine the charging/discharging frequency of the to-be-heated battery 30 based on the first frequency range.

It should be understood that different battery temperatures correspond to different frequency ranges of the dynamic control area. Therefore, the control unit 120 may determine a corresponding frequency range of the dynamic control area based on a monitored current temperature of the to-be-heated battery 30.

For example, refer to Table 1. If the temperature monitoring signal indicates that the temperature of the to-be-heated battery 30 is −10° C., a frequency range that is of the dynamic control area and that corresponds to the temperature is greater than 6 Hz, that is, the first frequency range is greater than 6 Hz. Therefore, the charging/discharging frequency of the to-be-heated battery 30 may be greater than 6 Hz, for example, 6.5 Hz.

In some examples, the preset correspondence between a battery temperature and the frequency range of the dynamic control area may be predetermined through a plurality of experiments. For example, a researcher may test an electrochemical impedance spectroscopy of a battery sample at different temperatures, and then perform electrochemical performance analysis based on the electrochemical impedance spectroscopy of the battery to determine frequency ranges of the dynamic control area that correspond to different temperatures, that is, determine the correspondence between a battery temperature and the frequency range of the dynamic control area. The correspondence may be stored in the control unit 120, or may be stored in a storage device that can be accessed by the control unit 120, so that the control unit 120 determines a corresponding frequency range of the dynamic control area based on a currently monitored battery temperature.

Figure 9:
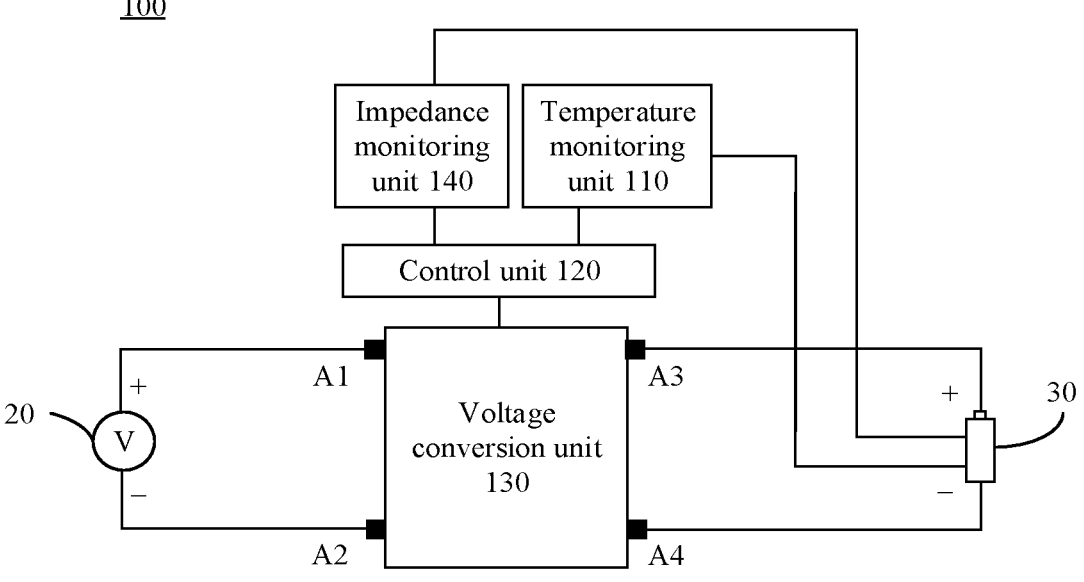
FIG. 9 is a schematic diagram of a structure of a battery heating system according to another embodiment of this application.

FIG. 9 is a schematic diagram of a structure of a battery heating system 100 according to another embodiment of this application. As shown in FIG. 9, the battery heating system 100 further includes an impedance monitoring unit 140. The impedance monitoring unit 140 is configured to monitor an impedance of the to-be-heated battery 30, and output an impedance monitoring signal, where the impedance monitoring signal is used to indicate the impedance of the to-be-heated battery 30. The impedance monitoring unit 140 may be configured to monitor a current impedance of the to-be-heated battery 30 in real time. In some examples, the impedance monitoring unit 140 may input an alternating current used for test to the to-be-heated battery 30, to detect an impedance of the battery in a current status.

In a second manner of determining the charging/discharging frequency of the to-be-heated battery 30, the control unit 120 may obtain an electrochemical impedance spectroscopy of the to-be-heated battery 30 in the current status based on the impedance monitoring signal sent by the impedance monitoring unit 140. The electrochemical impedance spectroscopy may be the electrochemical impedance spectroscopy shown in FIG. 8. The electrochemical impedance spectroscopy is used to indicate a correspondence between the impedance and the charging/discharging frequency that are of the to-be-heated battery 30 in the current status. The control unit 120 may determine, based on the electrochemical impedance spectroscopy, a second frequency range that is of the dynamic control area and that corresponds to the to-be-heated battery 30 in the current status. In some examples, the impedance monitoring unit 140 may detect impedances corresponding to alternating currents of different frequencies, to obtain impedances corresponding to the to-be-heated battery 30 at a plurality of frequencies, so as to obtain the electrochemical impedance spectroscopy of the to-be-heated battery 30.

In this embodiment of this application, the control unit 120 may determine, by using the impedance monitoring signal that is of the to-be-heated battery 30 and that is monitored by the impedance monitoring unit 140 in real time, the frequency range that is of the dynamic control area and that corresponds to the to-be-heated battery 30 in the current status, and further determine the charging/discharging frequency of the to-be-heated battery 30. The current status includes a current temperature of the to-be-heated battery 30 and another real-time condition, for example, parameters such as dryness and humidity. Therefore, the frequency range of the dynamic control area is obtained through real-time detection based on the current status of the to-be-heated battery 30, and is not pre-obtained based on experimental data. In this measurement manner, the dynamic control area of the to-be-heated battery 30 can be determined more accurately, to improve accuracy of determining the charging/discharging frequency of the to-be-heated battery 30, and prevent a phenomenon such as a low-temperature lithium plating reaction from occurring due to improper setting of the charging/discharging frequency, affecting battery performance.

Optionally, the voltage conversion unit is further configured to perform boosting or bucking processing on the first voltage or perform boosting or bucking processing on the second voltage, so that a charging current received by the to-be-heated battery 30 in the first time segment is less than a maximum charging current.

It should be understood that in a charging phase, to prevent an excessively large charging current from affecting performance of the to-be-heated battery 30, the charging current of the to-be-heated battery 30 should be less than a specific threshold. When working statuses of a battery are different, maximum charging currents allowed to pass through the battery are also different. For example, a working condition of the battery may include factors such as a battery temperature, a state of charge (SoC) of the battery, and a battery impedance. Therefore, the control unit 120 needs to dynamically determine a maximum charging current of the to-be-heated battery 30 based on a current working status of the to-be-heated battery 30, to control the charging current of the to-be-heated battery 30 to be less than the maximum charging current.

Optionally, the control unit 120 may determine a maximum charging current of the to-be-heated battery 30 in a current status in a plurality of manners. Several manners used to determine the maximum charging current in this embodiment of this application are described below.

In a first manner, the control unit 120 may determine a current value of a current maximum charging current based on a state of charge and the temperature that is of the to-be-heated battery 30 and that is indicated by the temperature monitoring signal.

Further, the control unit 120 may pre-obtain a first correspondence between a battery temperature, a state of charge, and a current value of a maximum charging current, and then determine the current value of the current maximum charging current of the to-be-heated battery based on a current temperature and a current state of charge that are of the to-be-heated battery, and the first correspondence.

For example, the control unit 120 may calculate and determine the state of charge of the to-be-heated battery 30 based on an electrical parameter of the to-be-heated battery 30 in the current status. For example, the electrical parameter may include but is not limited to parameters such as an output voltage, an output current, and a temperature that are of the to-be-heated battery.

In some examples, the first correspondence between a battery temperature, a state of charge, and a current value of a maximum charging current may be predetermined through a plurality of experiments. The first correspondence may be stored in the control unit 120, or may be stored in a storage device that can be accessed by the control unit 120, so that the control unit 120 determines a corresponding current value of the maximum charging current based on a battery temperature and a state of charge that are currently monitored.

In some other examples, the preset correspondence between a battery temperature and a current value of a maximum charging current may be provided by a battery manufacturer.

For example, Table 2 shows a correspondence between a battery temperature, a state of charge, and a current value of a maximum charging current. In Table 2, a battery with a capacity of 50 ampere-hours (Ah) is used as an example for description. Table 2 shows maximum charging currents of the battery at different temperatures and in different SoC. For example, as shown in Table 2, when the working temperature is −10° C. and the state of charge is 80%, the maximum charging current of the battery is 128 amperes (A).

TABLE 2

| | SoC | | | | | | | | |
|---|---|---|---|---|---|---|---|---|---|
| Temperature | 90% | 80% | 70% | 60% | 50% | 40% | 30% | 20% | 10% |
| −25° C. | 20 A | 39 A | 67 A | 91 A | 105 A | 104 A | 103 A | 103 A | 101 A |
| −10° C. | 63 A | 128 A | 195 A | 198 A | 193 A | 191 A | 189 A | 189 A | 186 A |
| 0° C. | 116 A | 232 A | 232 A | 226 A | 221 A | 218 A | 216 A | 215 A | 211 A |
| 10° C. | 201 A | 279 A | 273 A | 267 A | 261 A | 256 A | 254 A | 252 A | 247 A |

Relationship between a charging current and a temperature

In a second manner, the control unit 120 may receive the impedance monitoring signal sent by the impedance monitoring unit 140, to obtain a current impedance of the to-be-heated battery 30, and determine a current value of the maximum charging current based on the impedance monitoring signal. For example, the control unit 120 may determine the current value of the maximum charging current according to the following formula (4):

$$I_{ch} = \frac{V_{max} - V_{ocv}}{R_{cn}} \quad (4)$$

$I_{ch}$ represents a maximum charging current of a battery, $V_{max}$ represents a charging cut-off voltage of the battery, $V_{ocv}$ represents an open circuit voltage of the battery at a specific SoC point, and $R_{cn}$ represents an internal resistance of the battery at a specified frequency.

Optionally, the control unit 120 may recalculate, at intervals of a segment of time, the current value of the maximum charging current based on a feature that the internal resistance of the battery changes with a temperature, and adjust the charging current of the to-be-heated battery 30 based on the recalculated current value. For example, the control unit 120 may re-determine the current value of the maximum charging current each time the battery temperature rises by 2° C.

Similarly, the voltage conversion unit may be further configured to perform boosting or bucking processing on the first voltage $V_1$ or perform boosting or bucking processing on the second voltage $V_2$, so that a discharging current that is output by the to-be-heated battery 30 in the second time segment is less than a maximum discharging current.

It should be understood that similar to the charging phase, in a discharging phase, to prevent an excessively large discharging current from affecting performance of the to-be-heated battery 30, the discharging current of the to-be-heated battery 30 should be less than a specific threshold. Therefore, the control unit 120 needs to determine a maximum discharging current of the to-be-heated battery 30 based on a current working status of the to-be-heated battery 30, to control the discharging current of the to-be-heated battery 30 to be less than the maximum discharging current.

Optionally, the control unit 120 may determine a maximum discharging current of the to-be-heated battery 30 in a current status in a plurality of manners. Several manners used to determine the maximum discharging current in this embodiment of this application are described below.

In a first manner, the control unit 120 may be configured to determine a current value of a current maximum discharging current based on a state of charge and the temperature that is of the to-be-heated battery 30 and that is indicated by the temperature monitoring signal.

Further, the control unit 120 may pre-obtain a second correspondence between a battery temperature, a state of charge, and a current value of a maximum discharging current, and then determine the current value of the current maximum discharging current of the to-be-heated battery based on a current temperature and a current state of charge that are of the to-be-heated battery, and the second correspondence.

In some examples, the second correspondence between a battery temperature, a state of charge, and a current value of a maximum discharging current may be predetermined through an experiment. The second correspondence may be stored in the control unit 120, or may be stored in a storage device that can be accessed by the control unit 120, so that the control unit 120 determines a corresponding current value of the maximum discharging current based on a currently monitored battery temperature.

In some other examples, the preset correspondence between a battery temperature and a current value of a maximum discharging current may be provided by a battery manufacturer.

For example, Table 3 shows a correspondence between a battery temperature and a current value of a maximum discharging current. In Table 3, a battery with a capacity of 50 Ah is used as an example for description. Table 3 shows maximum discharging currents of the battery at different temperatures and in different states of charge. For example, as shown in Table 3, when the working temperature is −10° C. and the state of charge is 80%, the maximum discharging current of the battery is 530 A.

TABLE 3

| | State of charge (SoC) | | | | | | | | |
|---|---|---|---|---|---|---|---|---|---|
| Temperature | 90% | 80% | 70% | 60% | 50% | 40% | 30% | 20% | 10% |
| −25° C. | 389 A | 374 A | 356 A | 323 A | 286 A | 248 A | 197 A | 121 A | 38 A |
| −10° C. | 548 A | 530 A | 514 A | 495 A | 485 A | 474 A | 456 A | 349 A | 87 A |
| 0° C. | 660 A | 643 A | 619 A | 601 A | 581 A | 568 A | 559 A | 451 A | 213 A |
| 10° C. | 697 A | 677 A | 657 A | 638 A | 621 A | 606 A | 607 A | 546 A | 279 A |

Relationship between a discharging current and a temperature

In a second manner, the control unit 120 may receive the impedance monitoring signal sent by the impedance monitoring unit 140, to obtain a current impedance of the to-be-heated battery 30, and determine a current value of the maximum discharging current based on the impedance monitoring signal. For example, the control unit 120 may determine the current value of the maximum discharging current according to the following formula (5):

$$I_{dis} = \frac{V_{ocv} - V_{min}}{R_{dis}} \qquad (5)$$

$I_{dis}$ represents a maximum discharging current of a battery, $V_{min}$ represents a discharging cut-off voltage of the battery, $V_{oc}$ represents an open circuit voltage of the battery at a specific SoC point, and $R_{dis}$ represents an internal resistance of the battery at a specified frequency.

Optionally, the control unit 120 may recalculate, at intervals of a segment of time, the current value of the maximum discharging current based on a feature that the internal resistance of the battery changes with a temperature, and adjust the discharging current of the to-be-heated battery 30 based on the recalculated current value. For example, the control unit 120 may re-determine the current value of the maximum discharging current each time the battery temperature rises by 2° C.

Figure 10:
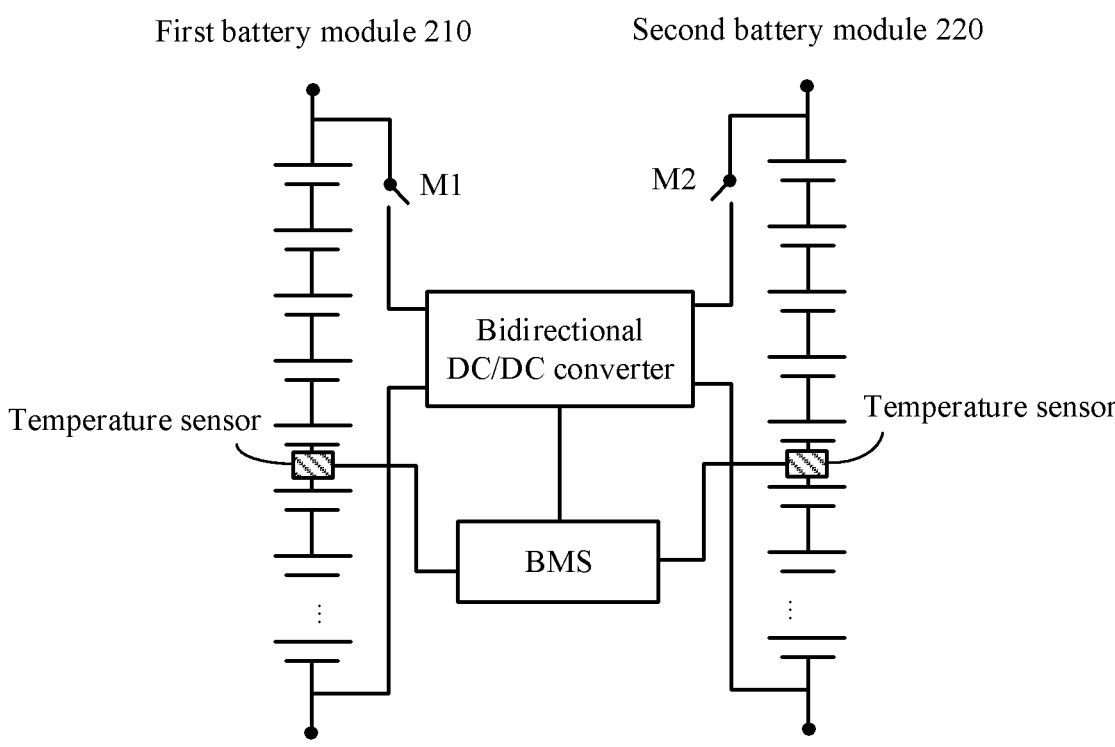
FIG. 10 is a schematic diagram of a battery heating system according to another embodiment of this application.

FIG. 10 is a schematic diagram of a battery heating system 100 according to another embodiment of this application. The solution in FIG. 10 may be applied to an in-vehicle system. As shown in FIG. 10, the battery 20 and the to-be-heated battery 30 may be respectively a first battery module 210 and a second battery module 220 in FIG. 10. The first battery module 210 and the second battery module 220 may heat each other through charging and discharging. The voltage conversion unit 130 may be a bidirectional DC/DC converter in FIG. 10. The control unit 120 may be integrated into a BMS of the in-vehicle system. The temperature monitoring unit 110 may include a temperature sensor in FIG. 10.

A positive electrode and a negative electrode of the first battery module 210 are respectively configured to connect to a first input end A1 and a second input end A2 of the bidirectional DC/DC converter, and a positive electrode and a negative electrode of the second battery module 220 are respectively configured to connect to a third input end A3 and a fourth input end A4 of the bidirectional DC/DC converter. The BMS may be configured to connect to a control end of the bidirectional DC/DC converter, and output a control signal to the bidirectional DC/DC converter. A plurality of temperature sensors are separately disposed in the first battery module 210 and the second battery module 220 and are connected to the BMS, and output a temperature monitoring signal to the BMS.

Optionally, a line connected to the bidirectional DC/DC converter may be designed, so that the bidirectional DC/DC converter can be connected to another circuit by using the line. In a time segment in which the to-be-heated battery 30 is not heated, the bidirectional DC/DC converter may be multiplexed in another circuit, to reduce circuit costs and simplify design. For example, a first switch transistor M1 may be disposed between the first battery module 210 and the bidirectional DC/DC converter. A second switch transistor M2 may be disposed between the second battery module 220 and the bidirectional DC/DC converter. When the battery heating system 100 does not work, the first switch transistor M1 and the second switch transistor M2 are in an off state. When the first battery module 210 and the second battery 220 need to be heated, the first switch transistor M1 and the second switch transistor M2 are in an on state.

In the battery heating solution in this embodiment of this application, an external heating component is not required, and only a circuit structure needs to be changed. For example, a bidirectional DC/DC converter included in an energy storage module implements heating, so that a structure is simple and implementation costs are low.

When the battery heating system 100 works, in the first half of a charging and discharging time period, the BMS may control the bidirectional DC/DC converter to boost the first battery module 210, and the first battery module 210 charges the second battery module 220. In this case, the first battery module 210 discharges electricity, and the second battery module 220 is charged. In the latter half of a charging and discharging time period, the BMS may control the bidirectional DC/DC converter to boost the second battery module 220, and the first battery module 220 charges the first battery module 210. In this case, the first battery module 210 is charged, and the second battery module 220 discharges electricity. The foregoing charging and discharging processes are performed alternately until the first battery module 210 and the second battery module 220 reach a target temperature. Optionally, in a heating process, the BMS may dynamically adjust a charging/discharging current and a charging/discharging frequency based on a change of a battery status, to optimize a heating effect.

In this embodiment of this application, the battery heating system may adjust the bidirectional DC/DC converter to implement mutual charging/discharging between batteries or modules, and mutual transfer of a charge between two batteries/modules. A self-heating battery is implemented by using Ohmic heat in a charging/discharging process. Therefore, self-heating may be implemented between batteries/modules inside a same battery system without using an external power supply to perform heating, thereby simplifying a heating system.

Figure 11:
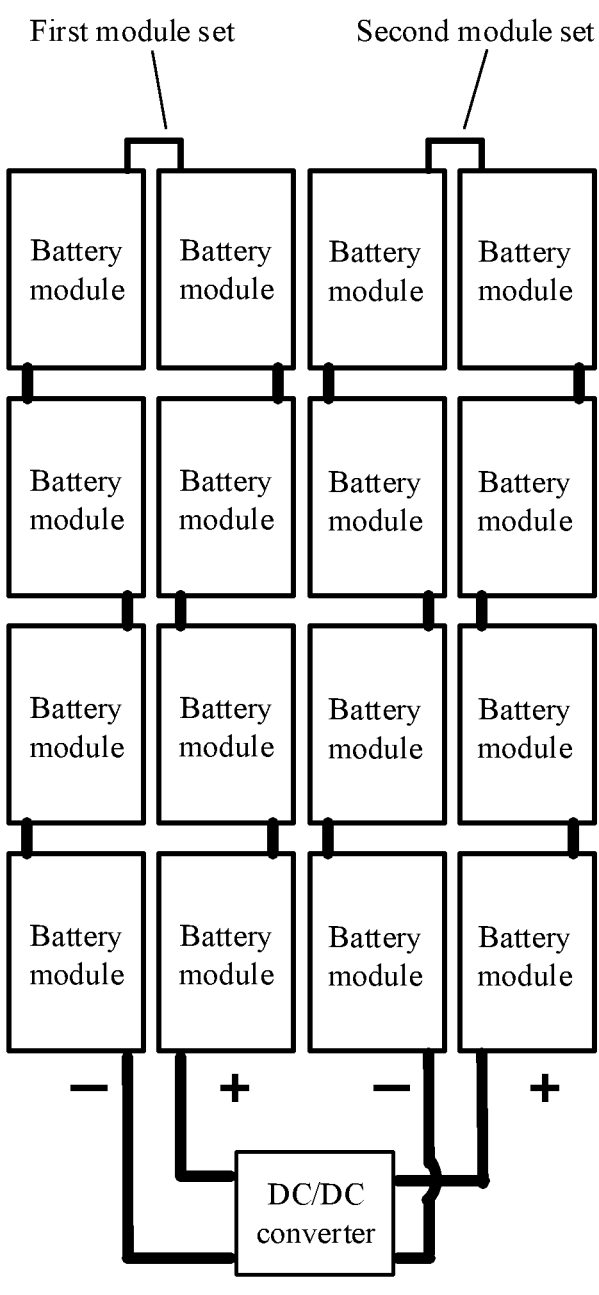
FIG. 11 is a schematic diagram of a battery heating system according to another embodiment of this application.

In some examples, a plurality of battery modules in a same battery pack may be divided into two parts, which are respectively used as a power supply and a to-be-heated battery. FIG. 11 is a schematic diagram of a battery heating system 100 according to another embodiment of this application. As shown in FIG. 11, for a battery pack including 16 battery modules, the 16 battery modules may be divided into a first module set and a second module set. Each module set includes eight battery modules, and the first module set and the second module set are a power supply and a to-be-heated battery for each other. It should be noted that the control unit 120 and the temperature monitoring unit 110 of the battery heating system 100 are not shown in FIG. 11 to FIG. 15. A person skilled in the art can understand that if the battery heating system 100 in FIG. 11 to FIG. 15 is applied to an in-vehicle system, the control unit 120 in FIG. 11 to FIG. 15 may be implemented by a BMS in the in-vehicle system, or may be implemented by another processor in the in-vehicle system. The temperature monitoring unit 110 may be implemented by a temperature sensor disposed in a battery pack.

Figure 12:
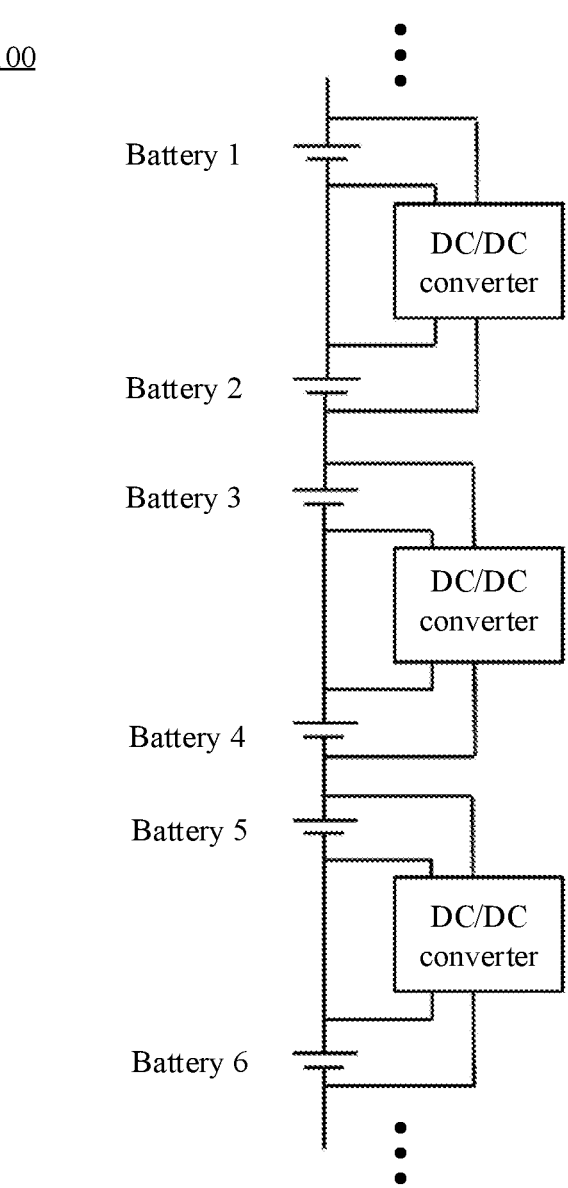
FIG. 12 is a schematic diagram of a battery heating system according to another embodiment of this application.

FIG. 12 is a schematic diagram of a battery heating system 100 according to another embodiment of this application. As shown in FIG. 12, the power supply 20 and the to-be-heated battery 30 may be different cells in a same battery module. The different cells may be connected by using bidirectional DC/DC converter, and self-heating of the batteries is implemented through charging and discharging.

Therefore, the battery heating system may implement mutual charging and discharging between different cells inside a same module by adjusting the bidirectional DC/DC converter, to implement a self-heating battery, so that an external power supply does not need to be used to perform heating, and a heating system is simplified.

Figure 13:
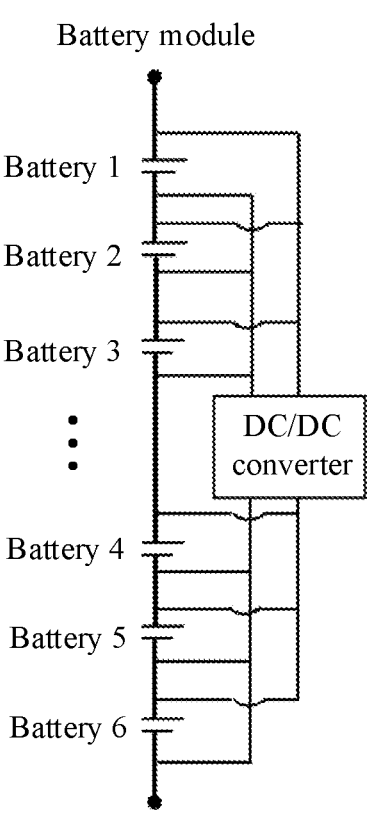
FIG. 13 is a schematic diagram of a battery heating system according to another embodiment of this application.

FIG. 13 is a schematic diagram of a battery heating system 100 according to another embodiment of this application. As shown in FIG. 13, the power supply 20 and the to-be-heated battery 30 may be separately a plurality of cells in a same battery module. In other words, a plurality of cells is connected in series and/or in parallel to form the power supply 20, and a plurality of cells are connected in series and/or in parallel to form the to-be-heated battery 30. Therefore, the battery heating system may implement mutual charging and discharging between different batteries inside a same module, to implement self-heating, so that an external power supply does not need to be used to perform heating, and a heating system is simplified.

Figure 14:
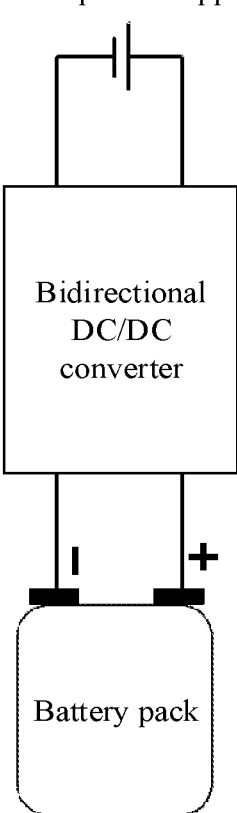
FIG. 14 is a schematic diagram of a battery heating system according to another embodiment of this application.

FIG. 14 is a schematic diagram of a battery heating system 100 according to another embodiment of this application. As shown in FIG. 14, the power supply 20 may be an external power supply, and the to-be-heated battery 30 may be a battery pack. The external power supply means that the to-be-heated battery 30 and the power supply 20 belong to different battery systems. For example, the external power supply may be a direct-current power supply, a battery, or the like. Alternatively, the external power supply is a battery pack in one in-vehicle system, and the power supply 20 is a battery pack in another in-vehicle system.

It should be understood that the foregoing various application scenarios of the battery heating system 100 are merely used as examples, and the solutions in the embodiments of this application are applicable to another scenario in which a battery needs to be heated.

FIG. 15 is a schematic diagram of a method 300 for controlling a battery heating system according to an embodiment of this application. The battery heating system includes a temperature monitoring unit configured to monitor a temperature of a to-be-heated battery, and output a temperature monitoring signal, where the temperature monitoring signal is used to indicate the temperature of the to-be-heated battery, and a voltage conversion unit, separately connected to a power supply and the to-be-heated battery, and configured to receive a first voltage that is input by the power supply or a second voltage that is input by the to-be-heated battery.

The method 300 includes the following.

S301: Obtain the temperature monitoring signal.

S302: Determine a control signal based on the temperature monitoring signal.

S303: Output the control signal to the voltage conversion unit, where the control signal is used to control the voltage conversion unit to perform boosting or bucking processing on the first voltage or perform boosting or bucking processing on the second voltage, so that the to-be-heated battery receives a charging current from the power supply in a first time segment by using the voltage conversion unit, and the to-be-heated battery outputs a discharging current to the power supply in a second time segment by using the voltage conversion unit.

In some examples, the outputting the control signal to the voltage conversion unit includes outputting the control signal when the temperature monitoring signal indicates that the temperature of the to-be-heated battery is lower than a preset threshold. The method further includes stopping outputting the control signal when the temperature monitoring signal indicates that the temperature of the to-be-heated battery is higher than or equal to the preset threshold.

In some examples, the control signal is used to control a charging/discharging frequency of the to-be-heated battery, so that the charging/discharging frequency of the to-be-heated battery falls within a frequency range of a dynamic control area.

In some examples, the method further includes determining, based on the temperature that is of the to-be-heated battery and that is indicated by the temperature monitoring signal and a preset correspondence between a battery temperature and the frequency range of the dynamic control area, a first frequency range that is of the dynamic control area and that corresponds to the temperature of the to-be-heated battery, and determining the charging/discharging frequency of the to-be-heated battery based on the first frequency range.

In some examples, the battery heating system further includes an impedance monitoring unit. The impedance monitoring unit is configured to monitor an impedance of the to-be-heated battery, and output an impedance monitoring signal, where the impedance monitoring signal is used to indicate the impedance of the to-be-heated battery. The method further includes obtaining the impedance monitoring signal, determining, based on the impedance monitoring signal, a second frequency range that is of the dynamic control area and that corresponds to the to-be-heated battery in a current status, and determining the charging/discharging frequency of the to-be-heated battery based on the second frequency range.

In some examples, the control signal is used to control the voltage conversion unit to perform boosting or bucking processing on the first voltage or perform boosting or bucking processing on the second voltage, so that a charging current received by the to-be-heated battery in the first time segment is less than a maximum charging current.

In some examples, the method further includes determining a current value of a current maximum charging current of the to-be-heated battery based on a state of charge and the temperature that is of the to-be-heated battery and that is indicated by the temperature monitoring signal.

In some examples, the battery heating system further includes an impedance monitoring unit. The impedance monitoring unit is configured to monitor an impedance of the to-be-heated battery, and output an impedance monitoring signal, where the impedance monitoring signal is used to indicate the impedance of the to-be-heated battery. The method further includes obtaining the impedance monitoring signal, and determining a current value of the maximum charging current based on the impedance monitoring signal.

In some examples, the control signal is used to control the voltage conversion unit to perform boosting or bucking processing on the first voltage or perform boosting or bucking processing on the second voltage, so that a discharging current that is output by the to-be-heated battery in the second time segment is less than a maximum discharging current.

In some examples, the method further includes determining a current value of a current maximum discharging current of the to-be-heated battery based on the temperature of the to-be-heated battery and a state of charge.

In some examples, the battery heating system further includes an impedance monitoring unit. The impedance monitoring unit is configured to monitor an impedance of the to-be-heated battery, and output an impedance monitoring signal, where the impedance monitoring signal is used to indicate the impedance of the to-be-heated battery. The method further includes obtaining the impedance monitoring signal, and determining a current value of the maximum discharging current based on the impedance monitoring signal.

In some examples, the power supply includes a first battery module, and the to-be-heated battery includes a second battery module.

FIG. 16 is a schematic diagram of a structure of a control device 400 according to an embodiment of this application. As shown in FIG. 16, the control device 400 includes a processor 410 and a communications interface 420. Optionally, the apparatus 400 may further include a memory 430. Optionally, the memory 430 may be coupled to the processor 410. The processor 410, the communications interface 420, and the memory 430 communicate with each other by using an internal connection path. The memory 430 is configured to store instructions, and the processor 410 is configured to execute the instructions stored in the memory 430, to implement the control method provided in the embodiments of this application.

Optionally, the control device 400 may be configured to perform functions of the control unit 120 in FIG. 2 and FIG. 9, or perform functions of the BMS in FIG. 10.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that such an implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, and may be located in one position, or may be distributed on multiple network units. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A battery heating system comprising:
   a temperature monitor configured to:
      monitor a temperature of a to-be-heated battery; and
      output a temperature monitoring signal indicating the temperature;
   an impedance monitor configured to:
      monitor an impedance of the to-be-heated battery; and
      output an impedance monitoring signal indicating the impedance;
   a controller coupled to the temperature monitor and the impedance monitor and configured to:
      receive the temperature monitoring signal;
      output a control signal based on the temperature monitoring signal;
      receive the impedance monitoring signal; and
      determine, based on the impedance monitoring signal, a first current value of a maximum charging current or a maximum discharging current; and
   a voltage converter coupled to the controller and configured to:
      couple to a power supply and the to-be-heated battery;
      receive the control signal from the controller;
      receive a first voltage from the power supply or a second voltage from the to-be-heated battery; and
      perform, based on the control signal, boosting processing or bucking processing on the first voltage or the second voltage to:
         enable the power supply to output a positive/negative pulse signal to the to-be-heated battery and to enable the power supply and the to-be-heated battery to alternately charge each other and discharge each other based on the positive/negative pulse signal; and
         make a charging current of the to-be-heated battery in a first time interval be less than the maximum charging current or make a discharging current of the to-be-heated battery in a second time interval be less than the maximum discharging current, wherein the first time interval is for charging the to-be-heated battery in a charging and discharging time period, and wherein the second time interval is for discharging the to-be-heated battery in the charging and discharging time period.

2. The battery heating system of claim 1, wherein the power supply comprises a first part of batteries in a battery pack, and wherein the to-be-heated battery comprises a second part of the batteries.

3. The battery heating system of claim 1, wherein the controller is further configured to:

output the control signal when the temperature monitoring signal indicates that the temperature is lower than a preset threshold; and stop outputting the control signal when the temperature monitoring signal indicates that the temperature is higher than or equal to the preset threshold.

4. The battery heating system of claim 1, wherein the voltage converter is further configured to adjust, using the control signal, a first amplitude of the positive/negative pulse signal by adjusting a second amplitude of a relative voltage between the first voltage and the second voltage.

5. The battery heating system of claim 1, wherein the voltage converter is further configured to adjust, using the control signal, a frequency of charging/discharging between the power supply and the to-be-heated battery by adjusting a speed of switching a relative voltage between the first voltage and the second voltage.

6. The battery heating system of claim 1, wherein the voltage converter is further configured to control, using the control signal, a frequency of charging/discharging between the power supply and the to-be-heated battery to obtain a charging/discharging frequency of the to-be-heated battery that falls within a first frequency range of a dynamic control area.

7. The battery heating system of claim 6, wherein the controller is further configured to:

determine, based on the temperature and a preset correspondence between a battery temperature and the first frequency range, a second frequency range of the dynamic control area corresponding to the temperature; and determine the charging/discharging frequency based on the second frequency range.

8. The battery heating system of claim 6, wherein the controller is further configured to:

determine, based on the impedance monitoring signal, a second frequency range of the dynamic control area corresponding to the to-be-heated battery in a current status; and determine, based on the second frequency range, the charging/discharging frequency.

9. The battery heating system of claim 1, wherein the controller is further configured to determine, based on a state of charge and the temperature, a second current value of a current maximum charging current of the to-be-heated battery.

10. The battery heating system of claim 1, wherein the controller is further configured to determine, based on the temperature and a state of charge, a second current value of a current maximum discharging current of the to-be-heated battery.

11. An electric vehicle comprising:

a first battery configured to output a first voltage;

a second battery configured to output a second voltage;

a temperature monitor coupled to the second battery and configured to:

monitor a temperature of the second battery; and output a temperature monitoring signal indicating the temperature;

an impedance monitor configured to:

monitor an impedance of the first battery or the second battery; and output an impedance monitoring signal indicating the impedance;

a controller coupled to the temperature monitor and the impedance monitor and configured to:

receive the temperature monitoring signal;

output a control signal based on the temperature monitoring signal;

receive the impedance monitoring signal; and determine, based on the impedance monitoring signal, a current value of a maximum charging current or a maximum discharging current; and a voltage converter coupled to the first battery and the second battery and configured to:

receive the first voltage or the second voltage;

receive the control signal from the controller; and perform, based on the control signal, boosting processing or bucking processing on the first voltage or the second voltage to:

enable the first battery to output a positive/negative pulse signal to the second battery and the first battery and the second battery to alternately charge each other and discharge each other based on the positive/negative pulse signal; and make a charging current of the second battery in a first time interval be less than the maximum charging current or make a discharging current of the second battery in a second time interval be less than the maximum discharging current, wherein the first time interval is for charging the second battery in a charging and discharging time period, and wherein the second time interval is for discharging the second battery in the charging and discharging time period.

12. The electric vehicle of claim 11, wherein the controller is further configured to:

output the control signal when the temperature monitoring signal indicates that the temperature is lower than a preset threshold; and stop outputting the control signal when the temperature monitoring signal indicates that the temperature is higher than or equal to the preset threshold.

13. The electric vehicle of claim 11, wherein the voltage converter is further configured to adjust, using the control signal, a first amplitude of the positive/negative pulse signal by adjusting a second amplitude of a relative voltage between the first voltage and the second voltage.

14. The electric vehicle of claim 11, wherein the voltage converter is further configured to adjust, using the control signal, a frequency of charging/discharging between the first battery and the second battery by adjusting a speed of switching a relative voltage between the first voltage and the second voltage.

15. A power supply system comprising:
a power supply configured to output a first voltage;
a to-be-heated battery configured to output a second voltage; and
a battery heating system comprising:
  a temperature monitor coupled to the to-be-heated battery and configured to:
    monitor a temperature of the to-be-heated battery; and
    output a temperature monitoring signal indicating the temperature;
  an impedance monitor configured to:
    monitor an impedance of the to-be-heated battery; and
    output an impedance monitoring signal indicating the impedance;
  a controller coupled to the temperature monitor and configured to:
    receive the temperature monitoring signal;
    output a control signal based on the temperature monitoring signal;
    receive the impedance monitoring signal; and
    determine, based on the impedance monitoring signal, a current value of a maximum charging current or a maximum discharging current; and
  a voltage converter coupled to the power supply, the to-be-heated battery, and the controller and configured to:
    receive the first voltage or the second voltage;
    receive the control signal from the controller; and
    perform, based on the control signal, boosting processing or bucking processing on the first voltage or the second voltage to:
      enable the power supply to output a positive/negative pulse signal to the to-be-heated battery and the power supply and the to-be-heated battery to alternately charge each other and discharge each other based on the positive/negative pulse signal; and
      make a charging current of the to-be-heated battery in a first time interval be less than the maximum charging current or make a discharging current of the to-be-heated battery in a second time interval be less than the maximum discharging current,
      wherein the first time interval is for charging the to-be-heated battery in a charging and discharging time period, and
      wherein the second time interval is for discharging the to-be-heated battery in the charging and discharging time period.

16. The power supply system of claim 15, wherein the power supply comprises a first part of batteries in a battery pack, and wherein the to-be-heated battery comprises a second part of the batteries.

17. The power supply system of claim 15, wherein the controller is further configured to:
  output the control signal when the temperature monitoring signal indicates that the temperature is lower than a preset threshold; and
  stop outputting the control signal when the temperature monitoring signal indicates that the temperature is higher than or equal to the preset threshold.

18. The power supply system of claim 15, wherein the voltage converter is further configured to adjust, using the control signal, a first amplitude of the positive/negative pulse signal by adjusting a second amplitude of a relative voltage between the first voltage and the second voltage.

19. The power supply system of claim 15, wherein the voltage converter is further configured to adjust, using the control signal, a frequency of charging/discharging between the power supply and the to-be-heated battery by adjusting a speed of switching a relative voltage between the first voltage and the second voltage.

20. The power supply system of claim 15, wherein the voltage converter is further configured to control, using the control signal, a frequency of charging/discharging between the power supply and the to-be-heated battery to obtain a charging/discharging frequency of the to-be-heated battery that falls within a first frequency range of a dynamic control area.

\* \* \* \* \*